United States Patent
Tachibana et al.

(10) Patent No.: US 10,020,760 B2
(45) Date of Patent: Jul. 10, 2018

(54) CONTROL METHOD FOR THREE-PHASE DC BRUSH LESS MOTOR, CONTROL DEVICE, AND IMAGE FORMING DEVICE

(71) Applicant: KONICA MINOLTA, INC., Chiyoda-ku, Tokyo (JP)

(72) Inventors: Yuta Tachibana, Toyokawa (JP); Katsuhide Sakai, Toyokawa (JP); Yasuhiro Koide, Toyohashi (JP); Yuhei Tatsumoto, Toyokawa (JP)

(73) Assignee: Konica Minolta, Inc., Chiyoda-ku, Tokyo (JP)

(*) Notice: Subject to any disclaimer, the term of this patent is extended or adjusted under 35 U.S.C. 154(b) by 0 days.

(21) Appl. No.: 15/181,633

(22) Filed: Jun. 14, 2016

(65) Prior Publication Data
US 2016/0373034 A1    Dec. 22, 2016

(30) Foreign Application Priority Data
Jun. 22, 2015 (JP) ................... 2015-124396

(51) Int. Cl.
*H02K 29/12* (2006.01)
*H02P 6/15* (2016.01)
(Continued)

(52) U.S. Cl.
CPC .......... *H02P 6/15* (2016.02); *G03G 15/5008* (2013.01); *G03G 15/757* (2013.01); *G03G 15/80* (2013.01); *H02P 6/16* (2013.01); *H02P 6/22* (2013.01)

(58) Field of Classification Search
CPC .... H02P 6/14; H02P 6/08; H02P 6/182; H02P 6/085; H02P 6/16; H02K 29/08; H02K 29/12
(Continued)

(56) References Cited

U.S. PATENT DOCUMENTS 4,644,233 A * 2/1987 Suzuki .................. H02K 29/08
    310/68 R
5,691,638 A * 11/1997 Bahn ...................... H02K 29/08
    318/653
(Continued)

FOREIGN PATENT DOCUMENTS

JP    9-163787 A    6/1997
JP    02-299495    12/1999
(Continued)

OTHER PUBLICATIONS

Office Action (Notice of Reasons for Rejection) dated Jul. 4, 2017, by the Japanese Patent Office in Japanese Patent Application No. 2015-124396, and an English Translation of the Office Action. (6 pages).

*Primary Examiner* — Rina Duda
(74) *Attorney, Agent, or Firm* — Buchanan Ingersoll & Rooney PC

(57) ABSTRACT

A control method for a three-phase DC brushless motor including a rotor that includes a plurality of magnetic poles and that is rotatable, a stator that includes a plurality of magnetic field generation parts to generate a magnetic field to be a driving source of the rotor, and a sensor to detect a magnetic pole of the rotor which pole passes through a first position in the stator is provided, the method including: detecting in which the sensor detects a first magnetic pole of the rotor which pole passes through the first position; estimating, based on a result of the detection of the first magnetic pole, time until the first magnetic pole reaches a second position in the stator; and controlling the plurality of magnetic field generation parts in such a manner that a suitable magnetic field is generated when the first magnetic pole passes through the second position.

17 Claims, 19 Drawing Sheets

(51) Int. Cl.
*H02P 6/16* (2016.01)
*H02P 6/22* (2006.01)
*G03G 15/00* (2006.01)

(58) Field of Classification Search
USPC ............ 318/400.37, 400.38, 400.01, 400.13
See application file for complete search history.

(56) References Cited

U.S. PATENT DOCUMENTS

| | | | | |
|---|---|---|---|---|
| 5,892,339 | A * | 4/1999 | Park | H02K 29/08 318/400.38 |
| 7,423,394 | B2 * | 9/2008 | Collins | H02P 6/16 318/400.01 |
| 2004/0135530 | A1 * | 7/2004 | Liu | H02P 6/16 318/400.34 |
| 2007/0247092 | A1 * | 10/2007 | Komatsu | H02P 6/06 318/400.04 |
| 2008/0309269 | A1 * | 12/2008 | Kausch | H02P 6/16 318/400.38 |

FOREIGN PATENT DOCUMENTS

| | | |
|---|---|---|
| JP | 2006-166564 A | 6/2006 |
| JP | 2013-127565 A | 6/2013 |

* cited by examiner

CONTROL METHOD FOR THREE-PHASE DC BRUSH LESS MOTOR, CONTROL DEVICE, AND IMAGE FORMING DEVICE

The entire disclosure of Japanese Patent Application No. 2015-124396 filed on Jun. 22, 2015 including description, claims, drawings, and abstract are incorporated herein by reference in its entirety.

BACKGROUND OF THE INVENTION

Field of the Invention

The present invention relates to a control method for a three-phase DC brushless motor and specifically related to a control method for a three-phase DC brushless motor in which method rotation is controlled based on information from one position sensor of a magnetic pole of a rotor.

Description of the Related Art

A three-phase DC brushless motor basically includes a rotor, which includes a permanent magnet, and a stator provided in a vicinity thereof. Then, magnetic fields generated by a plurality of coils provided in the stator are serially switched and the rotor is rotated, whereby the three-phase DC brushless motor is driven. In the driving, positions of the magnetic poles of the rotor are grasped with three position sensors. Based on positional information therefrom, directions of a current applied to the coils attached to the stator are switched. Accordingly, it is possible to serially switch the magnetic fields generated by the coils in the stator at timing suitable for the rotation of the rotor.

Recently, a three-phase DC brushless motor, which has one position sensor instead of three, such as a DC brushless motor disclosed in JP 9-163787 A is developed. Such a three-phase DC brushless motor estimates a position of a different magnetic pole, which position is detected by reduced position sensors, based on positional information of a magnetic pole of a rotor which information is acquired from one position sensor. Then, a current applied to a coil attached to a stator is switched based on the positional information (hereinafter, referred to as control method for three-phase DC brushless motor in related art).

Here, in the control method for a three-phase DC brushless motor in a related art, a position or a different magnetic pole is estimated based on positional information of a magnetic pole of a rotor detected by one position sensor on the assumption that magnetic poles of the rotor are arranged equal intervals. However, magnetic poles of the rotor are not always arranged at equal intervals due to an influence of a magnetization variation and the like. Thus, it is difficult to grasp a position of a different magnetic pole accurately by the control method for a three-phase DC brushless motor in a related art. As a result, by the control method for a three-phase DC brushless motor in a related art, it is not possible to switch magnetic fields, which are generated by coils of a stator, at timing suitable for a rotation or a rotor and there is a concern for a trouble such as rotation irregularity.

SUMMARY OF THE INVENTION

An object of the present invention is to provide, with respect to a control method for the three-phase DC brushless motor in which method rotation is controlled based on information from one position sensor, a control method for a three-phase DC brushless motor which method can control rotation irregularity compared to a control method for a three-phase DC brushless motor in a related art.

To achieve the abovementioned object, according to an aspect, a control method for a three-phase DC brushless motor including a rotor that includes a plurality of magnetic poles and that is rotatable, a stator that includes a plurality of magnetic field generation parts to generate a magnetic field to be a driving source of the rotor, and a sensor to detect a magnetic pole of the rotor which pole passes through a first position in the stator reflecting one aspect of the present invention comprises: detecting in which the sensor detects a first magnetic pole of the rotor which pole passes through the first position; estimating, based on a result of the detection of the first magnetic pole, time until the first magnetic pole reaches a second position in the stator; and controlling, based on a result of the estimation of the time until the second position is reached, the plurality of magnetic field generation parts in such a manner that a suitable magnetic field is generated when the first magnetic pole passes through the second position.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

Figure 1:
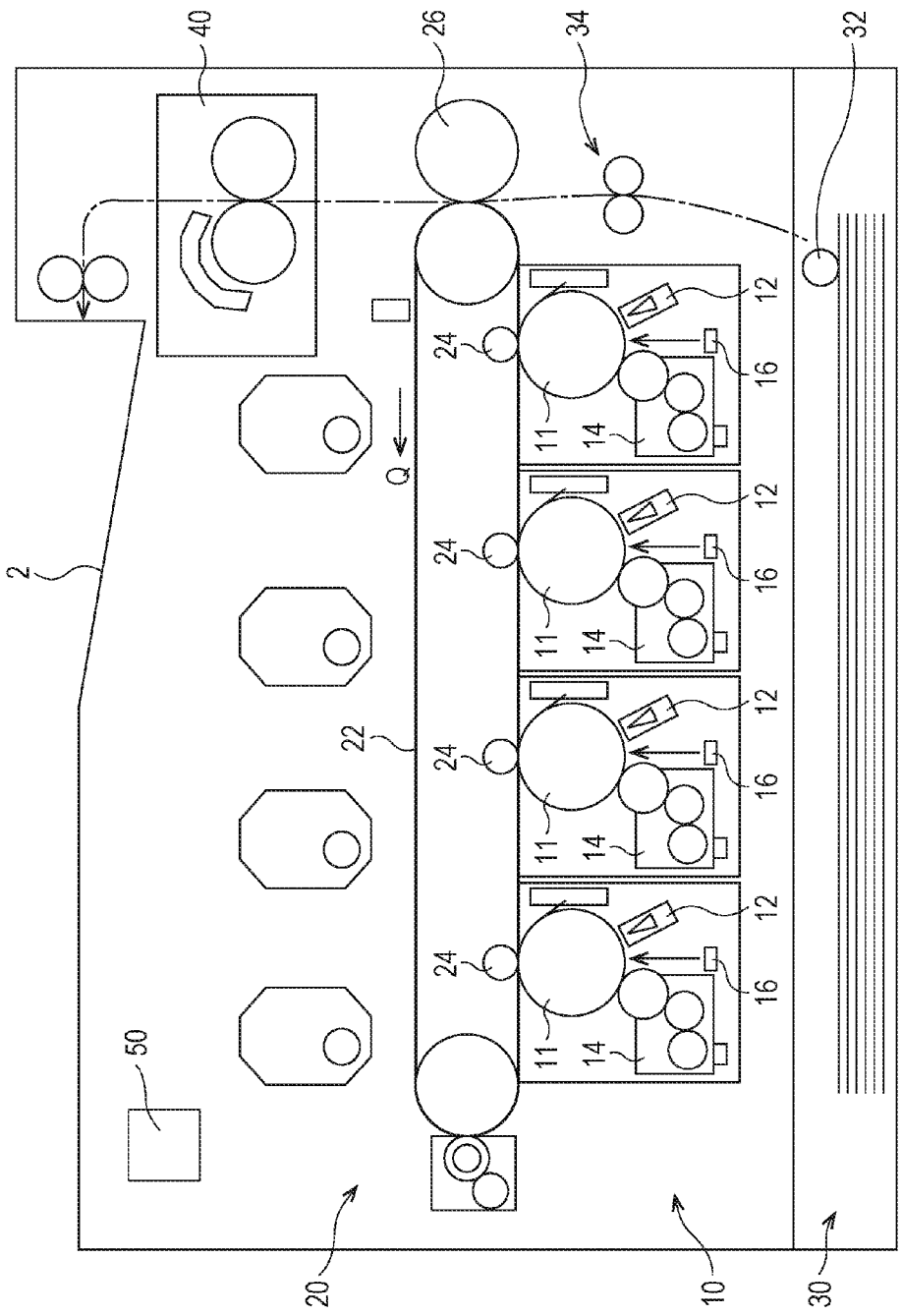
FIG. 1 is a schematic view illustrating an internal structure of an image forming device according to an embodiment.

(Outline Configuration of Image Forming Device, see FIG. 1)

In the following, a three-phase DC brushless motor 100 controlled by a control method for a three-phase DC brushless motor which method is an embodiment, a photoreceptor drum 11 including the three-phase DC brushless motor 100, an intermediate transfer belt 22, and an image forming device 1 including the photoreceptor drum 11 and the intermediate transfer belt 22 will be described with reference to the attached drawings. In the drawings, a common sign is assigned to the same members and parts and an overlapped description is omitted.

A color image forming device illustrated in FIG. 1 is a tandem-system electrophotographic printer and includes imaging units 10 to respectively form toner images in yellow (Y), magenta (M), cyan (C), and black (K), an intermediate transfer unit 20, and a control unit 50 to control each unit.

Each imaging unit 10 is a unit in which an electrostatic charger 12, a developing unit 14, and the like are arranged with the photoreceptor drum 11 as a center. The imaging unit 10 develops an electrostatic latent image, which is drawn on each photoreceptor drum 11 with light emitted from a laser scanning optical unit 16, with the developing unit 14 and forms a toner image in each color. Note that the photoreceptor drum 11 is driven by the three-phase DC brushless motor 100 described later.

The intermediate transfer unit 20 includes an intermediate transfer belt 22 that is rotationally driven by the three-phase DC brushless motor 100 described later in an endless manner in a direction of an arrow Q. Then, the intermediate transfer unit 20 performs primary transfer of the toner image, which is formed on each photoreceptor drum 11, onto the intermediate transfer belt 22 by an electric field applied by a primary transfer roller 24 facing each photoreceptor drum 11. Note that since an image forming process by such an electrophotography method is already known, a detailed description thereof is omitted.

In a lower part of a main body of a device, an automatic paper feeding unit 30 that feeds a transferred material (hereinafter, referred to as paper) one by one is arranged. The paper is fed from a paper feeding roller 32 to a nip part between the intermediate transfer belt 22 and a secondary transfer roller 26 through a pair of timing rollers 34. With an electric field applied from the secondary transfer roller 26, secondary transfer of a toner image (composite color image) is performed. Then, the paper is fed to a fixing unit 40 and toner is heated and fixed. Subsequently, the paper is ejected to a tray part 2 arranged on a top surface of the main body of the device.

Figure 2:
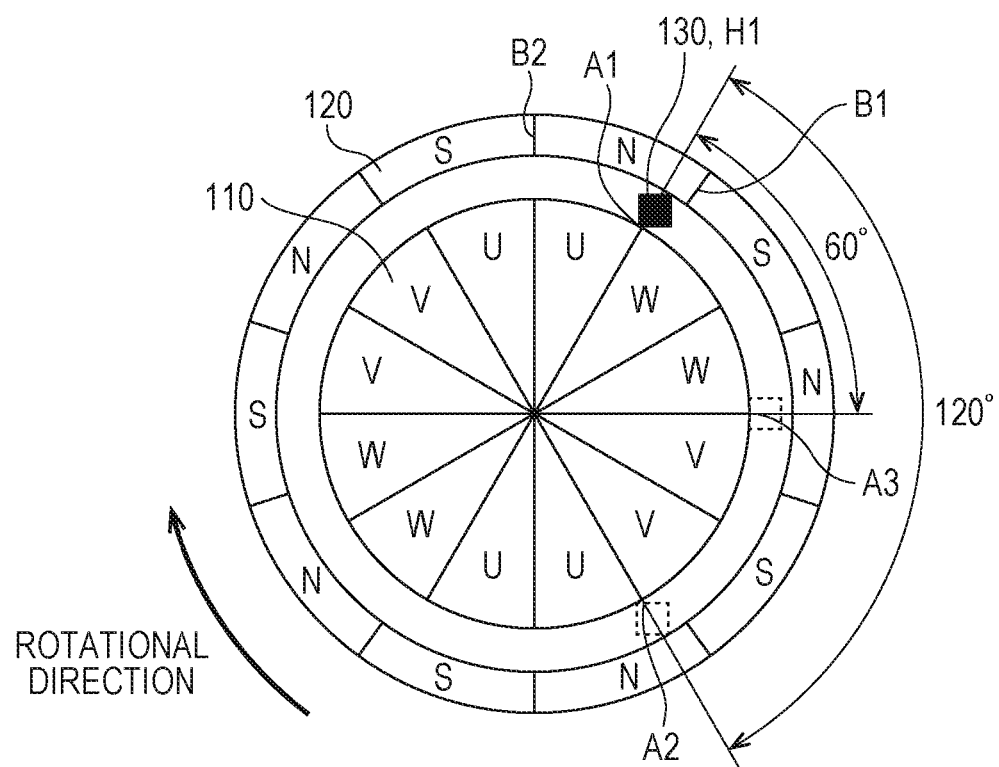
FIG. 2 is a schematic view illustrating a configuration of a three-phase DC brushless motor according to an embodiment.

(Configuration of Three-Phase DC Brushless Motor, see FIG. 2)

As illustrated in FIG. 2, in the three-phase DC brushless motor 100 attached to the intermediate transfer belt 22, a cylindrical rotor 120 rotates around a stator 110.

The stator 110 includes 12 coils in total which coils are four U-phase coils U, four V-phase coils V, and four W-phase coils W. Further, when seen in a direction of a rotary shaft of the rotor 120, these coils are arranged in order of a coil U, a coil V, and a coil W or in order of a coil U, a coil W, and a coil V at equal intervals of 30° along an inner peripheral surface of the rotor 120.

The rotor 120 includes ten magnetic poles. Further, when seen in the direction of the rotary shaft of the rotor 120, these magnetic poles are arranged at intervals of about 36° in such a manner that a north pole and a south pole are arranged alternately.

Magnetic fields generated by the coils provided to the stator 110 are serially switched and the rotor 120 is rotated, whereby the three-phase DC brushless motor 100 with ten poles and twelve slots which motor is formed in such a manner is driven. Note that currents applied to the coils are switched by the control unit 50 through an inverter circuit 140 connected to the coils, whereby magnetic fields generated by the coils of the stator 110 are switched.

Further, the three-phase DC brushless motor 100 includes a Hall element 130. The Hall element 130 functions as a position sensor to acquire positional information of magnetic poles of the rotor 120. The Hall element 130 is provided on an inner peripheral side of the rotor 120. When detecting a boundary of the magnetic poles included in the rotor 120, the Hall element 130 transmits a signal to the control unit 50.

(Outline of Control of Three-Phase DC Brushless Motor, see FIG. 2)

The three-phase DC brushless motor 100 includes one Hall element to acquire positional information of the magnetic poles of the rotor 120. Thus, it is necessary to control rotation by a method different from that for a general three-phase DC brushless motor including three Hall elements H1, H2, and H3 (H2 and H3 are not illustrated). In the following, an outline of a control method for the three-phase DC brushless motor 100 will be described.

In control of the three-phase DC brushless motor 100, the Hall element 130 corresponding to the Hall element H1 in the general three-phase DC brushless motor first detects a boundary of one of the magnetic poles of the rotor 120, such as a boundary B1 illustrated in FIG. 2. Then, a detection signal is transmitted to the control unit 50. Based on this signal, the control unit 50 estimates time at which the boundary B1 reaches a different position in the stator 110.

Here, the different position is each of positions corresponding to the Hall elements H2 and H3 in the general three-phase DC brushless motor including three Hall elements. More specifically, there is a position A3 corresponding to the Hall element H3 at a position away in the rotational direction of the rotor 120 for 60° from a position A1 where the Hall element 130 is provided. Further, there is a position A2 corresponding to the Hall element H2 at a position away in the rotational direction of the rotor 120 for 120° from the Hall element 130.

Further, time at which the boundary B1 reaches the position A2 or A3 in the stator 110 is estimated by division of a distance between the position A1 and the position A2 by a rotational speed of the rotor 120 or by division of a distance between the position A1 and the position A3 by the rotational speed of the rotor 120.

Then, at the time at which the boundary B1 reaches the position A2 or the position A3, the control unit 50 switches energization to the coils of the stator 110.

Moreover, when the Hall element 130 detects a boundary B2 that is a boundary of a magnetic pole following the boundary B1, a signal is transmitted to the control unit 50. Then, a period of time until the boundary B2 reaches the position A2 or A3 is estimated and energization to the coils of the stator 110 is switched based on this period of time.

In such a manner, operations of detecting a boundary of each magnetic pole that passes through the position A1, estimating time at which the positions A2 and A3 are reached, and switching energization are repeatedly performed, whereby a rotation of the three-phase DC brushless motor 100 is controlled.

Figure 3:
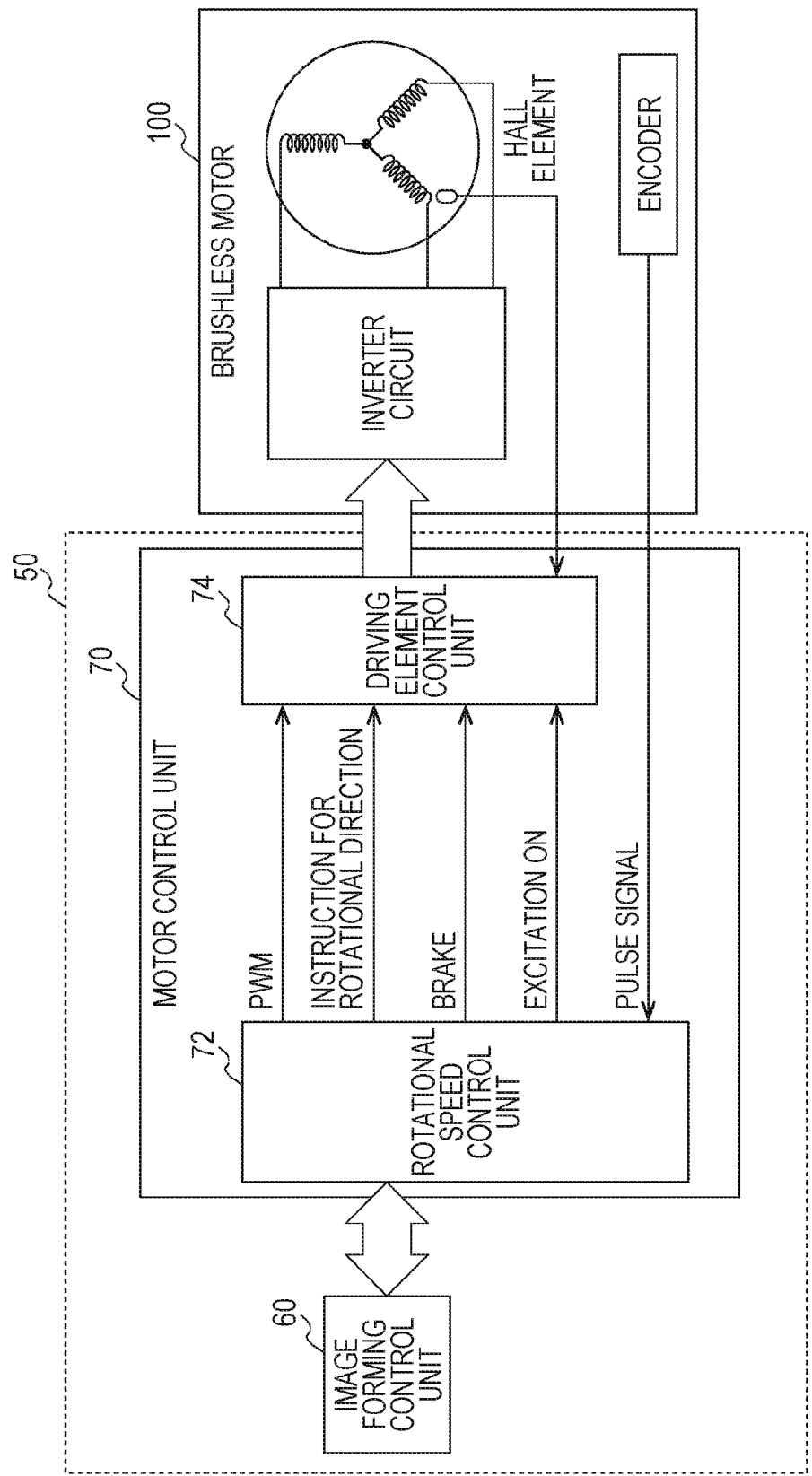
FIG. 3 is a block diagram illustrating a component related to control of a three-phase DC brushless motor according to an embodiment.
Figure 4:
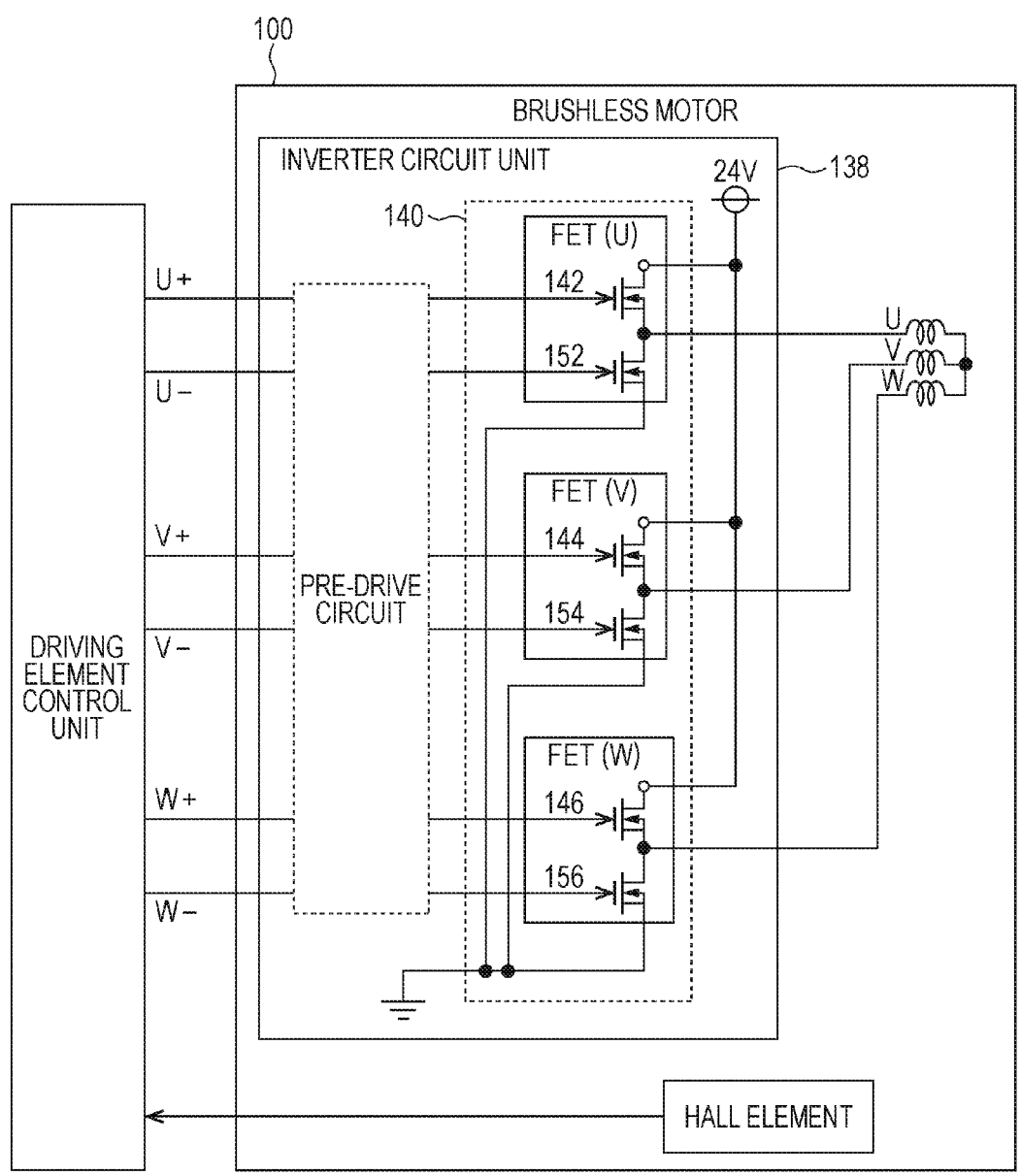
FIG. 4 is a block diagram illustrating a component related to control of a three-phase DC brushless motor according to an embodiment.
Figure 5:
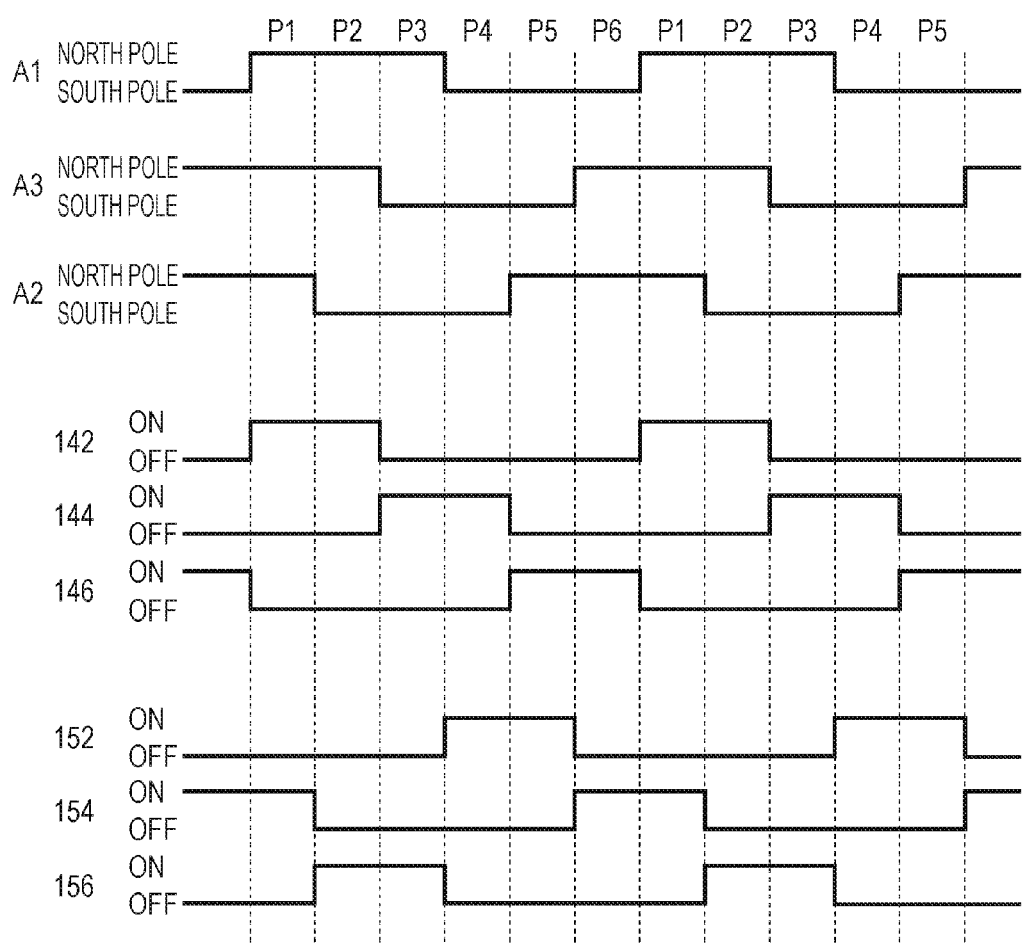
FIG. 5 is a timing chart illustrating an energization pattern related to control of a three-phase DC brushless motor according to an embodiment.

(Component Related to Control of Three-Phase DC Brushless Motor, see FIG. 3 to FIG. 5)

As described above, the control unit 50 switches a current applied to the coils through the inverter circuit 140 connected to the coils, whereby a rotation of the rotor 120, that is, a rotation of the three-phase DC brushless motor 100 is performed. In the following, a component related to the control will be described.

As illustrated in FIG. 3, the control unit 50 mainly includes two control units that are an image forming control unit 60 and a motor control unit 70. The motor control unit 70 includes a rotational speed control unit 72 and a driving element control unit 74. Note that the control unit 50 is an electric circuit such as a processor and may include a memory.

The image forming control unit 60 acquires various kinds of information from an interface for an input from a user which interface is provided in the image forming device 1, a computer terminal connected to the image forming device 1, a sensor provided in the image forming device 1, and the like. These kinds of information are stored in a memory included in the image forming control unit 60. Further, the image forming control unit 60 instructs the imaging unit 10 to form an image based on these kinds of information. Moreover, the image forming control unit 60 gives an instruction to the motor control unit 70.

The instruction given by the image forming control unit 60 to the motor control unit 70 is received by the rotational speed control unit 72. According to the received instruction, the rotational speed control unit 72 determines power supply by PWM control to the three-phase DC brushless motor 100, a rotational direction, existence of a brake, excitation, and the like and transmits a signal to the driving element control unit 74. Further, in the above determination, the rotational speed control unit 72 receives a signal from an encoder that reads a rotational speed of the three-phase DC brushless motor. The driving element control unit 74 selects an energization pattern with respect to the three-phase DC brushless motor 100 in such a manner that the rotational direction and the like determined in the rotational speed control unit 72 are satisfied. Note that the arrival time of the magnetic pole is estimated in the driving element control unit 74.

As illustrated in FIG. 4, an inverter circuit unit 138 includes a pre-drive and the inverter circuit 140.

The pre-drive converts a voltage of the signal transmitted from the driving element control unit 74 into an operation voltage of each FET of the inverter circuit 140 described later.

The inverter circuit 140 includes six electric field effect transistors (FET) 142, 144, 146, 152, 154, and 156 connected to the coils of the stator 110. Note that the U-phase coils U, the V-phase coils V, and the W-phase coils W, which are connected to the inverter circuit 140 are in star connection.

One end of each of the FETs 142 and 152 is connected to the coil U of the stator 110. Further, the other end of the FET 142 is connected to a power source having 24 V and the other end of the FET 152 is connected to a ground.

One end of each of the FETs 144 and 154 is connected to the coil V of the stator 110. Further, the other end of the FET 144 is connected to the power source having 24 V and the other end of the FET 154 is connected to the ground.

One end of each of the FETs 146 and 156 is connected to the coil W of the stator 110. Further, the other end of the FET 146 is connected to the power source having 24 V and the other end of the FET 156 is connected to the ground.

Then, in the inverter circuit 140, for example, when the FBI 142 and the FET 156 are turned ON, current flows from the U-phase to the W-phase. The U-phase is excited in a north pole and the W-phase is excited in the south pole. Accordingly, the rotor 120 is rotated for 12°. Then, when the FET 144 is turned ON in a state in which the FET 142 is turned OFF and the FET 156 is ON, current flows from the V-phase to the W-phase. The V-phase is excited in the north pole and the W-phase is excited in the south pole. As a result, the rotor 120 is further rotated for 12°.

In such a manner, when ON/OFF of each FET of the inverter circuit 140 is switched, it is possible to switch the magnetic fields of the coils provided in the stator 110 and to rotate the rotor 120. Note that as illustrated in FIG. 5, there are six kinds of energization states created by turning ON/OFF of each FET. More specifically, the six kinds are an energization pattern P1 that is an energization state in which the FETs 142 and 154 are ON and the other FETs are OFF, an energization pattern P2 that is an energization state in which the FETs 142 and 156 are ON and the other FETs are OFF, an energization pattern P3 that is an energization state in which the FETs 144 and 156 are ON and the other FETs are OFF, an energization pattern P4 that is an energization state in which the FETs 144 and 152 are ON and the other FETs are OFF, an energization pattern P5 that is an energization state in which the FETs 146 and 152 are ON and the other FETs are OFF, and an energization pattern P6 that is an energization state in which the FETs 146 and 154 are ON and the other FETs are OFF.

(Detail of Control of Three-Phase DC Brushless Motor, see FIG. 6 to FIG. 11)

First, a main flow of control of the three-phase DC brushless motor will be described.

Figure 6:
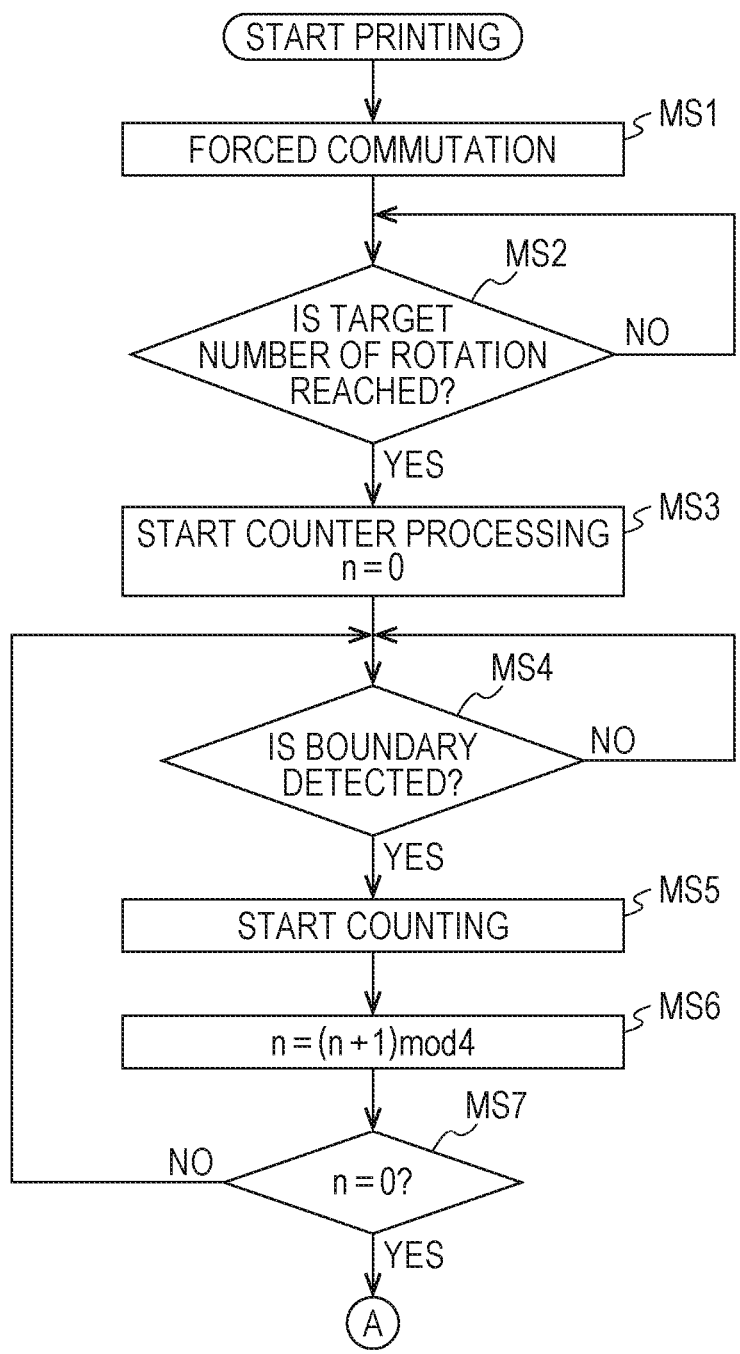
FIG. 6 is a main flowchart of control of a three-phase DC brushless motor according to an embodiment.

As illustrated in FIG. 6, the main flow of the control of the three-phase DC brushless motor is started when execution of a new print job is determined.

In step MS1 of the present control, the control unit 50 starts energization with respect to the inverter circuit 140 and performs so-called forced commutation in which the three-phase DC brushless motor 100 is forcibly driven in a rotary manner. Note that in the forced commutation, a detailed position of each magnetic pole in the rotor 120 is not grasped.

In step MS2, the control unit 50 determines whether the number of rotations of the three-phase DC brushless motor 100 reaches the target number of rotations. When the target number of rotations is reached, the present control goes to step MS3. When it is determined that the target number of rotations is not reached, the present control holds in step MS2.

Figure 8:
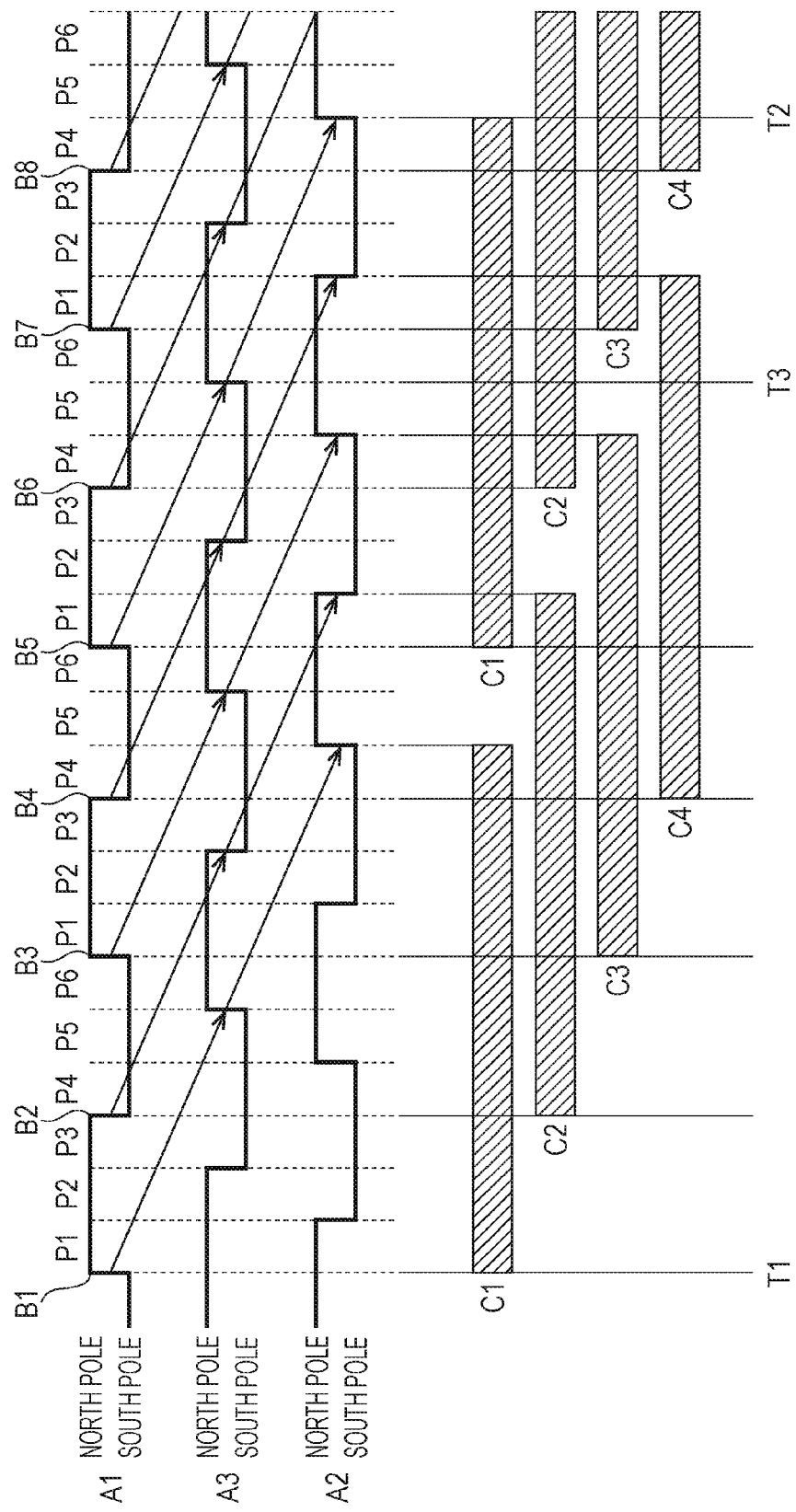
FIG. 8 is a timing chart illustrating start timing of a counter in control of a three-phase DC brushless motor according to an embodiment.

In step MS3, the control unit 50 activates a counter C1. In this case, in the control unit 50, a variable n indicating a number assigned to a counter is in a state of n=0. Further, as illustrated in FIG. 8, the counter C1 is a counter that starts counting with time T1, at which a boundary B1 of a magnetic pole passes through the position A1, as reference time.

In step MS4, the control unit 50 determines whether the boundary B1 of the magnetic pole passes through the position A1, that is, whether the Hall element 130 detects a boundary of a magnetic pole. When there is a detection signal from the Hall element 130, the present control goes to step MS5. When there is no detection signal, waiting is performed in step MS4.

In step MS5, the control unit 50 starts counting with the counter C1 since the Hall element 130 detects a boundary of a magnetic pole. Note that the counting with the counter C1 is stopped at time at which it is assumed that the boundary B1 reaches the position A2.

In step MS6, the control unit 50 changes the variable n indicating a number assigned to the counter from n=0 to n=1. More specifically, processing that is n=(n+1) mod 4 is performed and the variable n is changed from n=0 to n=1. Then, when the variable n becomes n=1, a counter C2 is activated.

In step MS7, the control unit 50 determines whether the variable n is 0. When the variable n is 0, the present control goes to step MS8. When the variable n is other than 0, the present control goes back to step MS4.

When the control goes back to step MS4, steps from MS4 to MS7 are repeatedly performed until a counter C4 starts counting. More specifically, as illustrated in FIG. 8, the counter C2 starts counting when a boundary B2 of the magnetic pole which boundary passes through the position A1 after the boundary B1 of the magnetic pole is detected. Then, the variable n is changed from n=1 to n=2 and a counter C3 is activated. When the counter C3 is activated, the control goes back to step MS4 again. Then, when a boundary B3 of the magnetic pole which boundary passes through the position A1 after the boundary B2 of the magnetic pole is detected, the counter C3 starts counting. Moreover, the variable n is changed from n=2 to n=3 and a counter C4 is activated. After the activation of the counter C4, the control goes back to step MS4 again. When a boundary B4 of the magnetic pole which boundary passes through the position A1 after the boundary B3 of the magnetic pole is detected, the counter C4 starts counting. Finally, the variable n is changed from n=3 to n=0 and the present control goes to step MS8. Note that the counters C2 to C4 respectively stop the counting at time at which it is estimated that the boundaries B2 to B4 reaches the position. A2.

Figure 7:
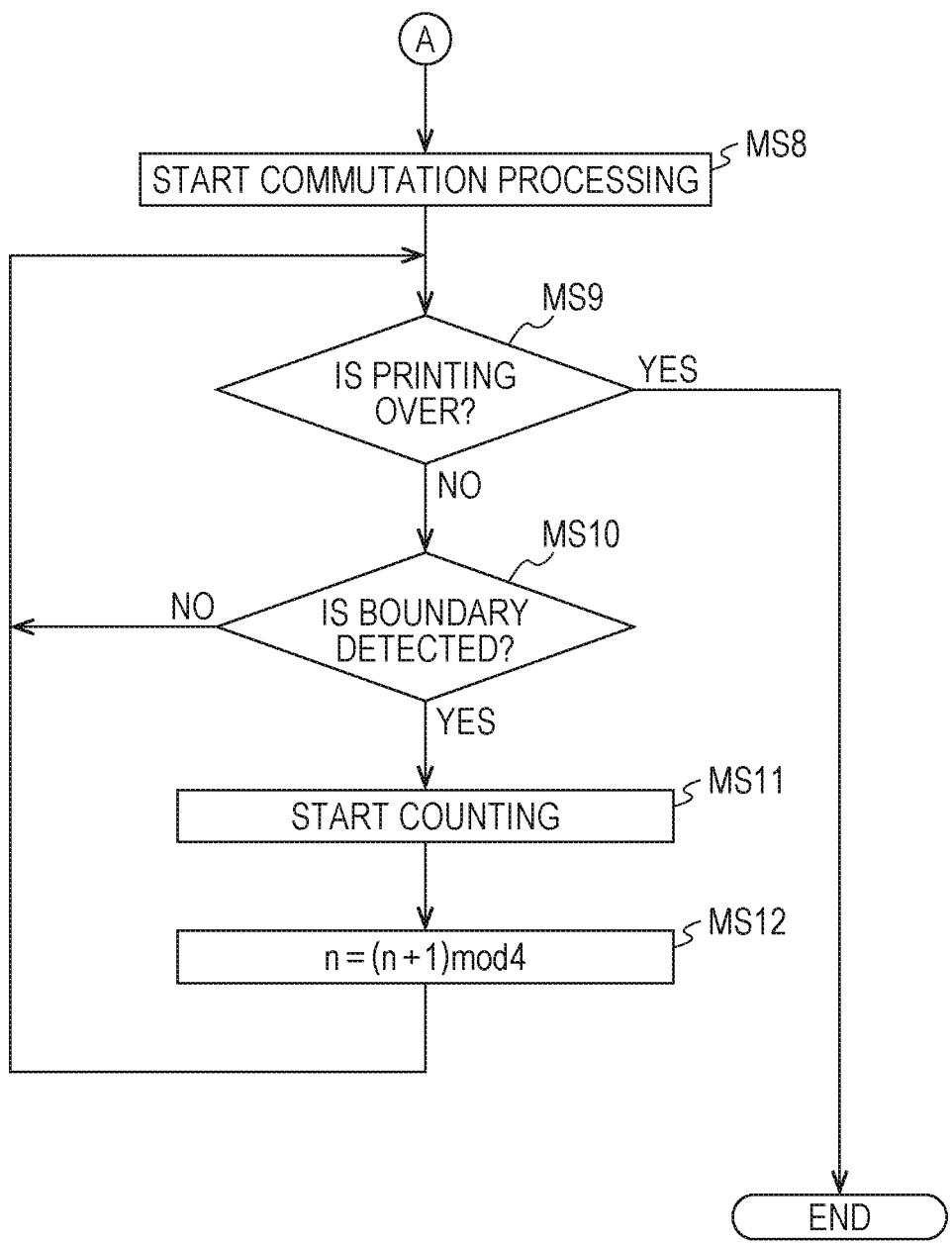
FIG. 7 is a main flowchart of control of a three-phase DC brushless motor according to an embodiment.

As illustrated in FIG. 7, in step MS8, the control unit 50 rotates the three-phase DC brushless motor in a stationary energization state commutation processing). That is, the control unit 50 reads count values of the counters C1 to C4. At time at which the boundaries B1 to B4 of each magnetic pole reach the position A2 or the position A3, the control unit 50 selects an appropriate energization pattern and rotates the three-phase DC brushless motor. Note that how to select an appropriate energization pattern will be described later.

In step MS9, the control unit 50 determines whether the print job is over. When it is determined that the print job is over, the present control is ended. When the print job is not over, the present control goes to step MS10.

In step MS10, the control unit 50 determines whether a boundary of a new magnetic pole such as a boundary B5 illustrated in FIG. 8 passes through the position A1, that is, whether the Hall element 130 detects a boundary of the magnetic pole. When there is a detection signal from the Hall element 130, the present control goes to step MS11. When there is no detection signal, the control goes back to step MS9.

In step MS11, the control unit 50 starts counting with a counter since the Hall element 130 detects a boundary of a new magnetic pole. For example, as illustrated in FIG. 8, when the Hall element 130 detects the boundary B5 as the boundary of the new magnetic pole, the control unit 50 starts counting with the counter C1. Note that based on this counting and time at which it is estimated that the boundary B5 reaches the position A2, the control unit 50 selects an appropriate energization pattern when the boundary B5 reaches the position A2.

In step MS12, the control unit 50 changes the variable n indicating a number assigned to a counter. More specifically, processing that is n=(n+1) mod 4 is performed. Thus, when the variable n until that time is 0, the variable n is changed from n=0 to n=1. Then, the present control goes back to MS9. Note that since the variable is changed from n=0 to n=1, the counter C2 starts counting when a boundary B6 of the magnetic pole which boundary reaches the position A1 after the boundary B5 is detected.

As described above, in the present control, counting is started by the counters C1, C2, C3, and C4 in this order at each time the Hall element 130 detects a boundary of a magnetic pole. After one cycle, a cycle in which the counting is started again by the counters C1, C2, C3, and C4 in this order is repeated. Accordingly, the control unit 50 can grasp timing at which a boundary of each magnetic pole of the rotor 120 passes through the positions A2 and A3, select an appropriate energization pattern, and rotate the three-phase DC brushless motor.

Figure 9:
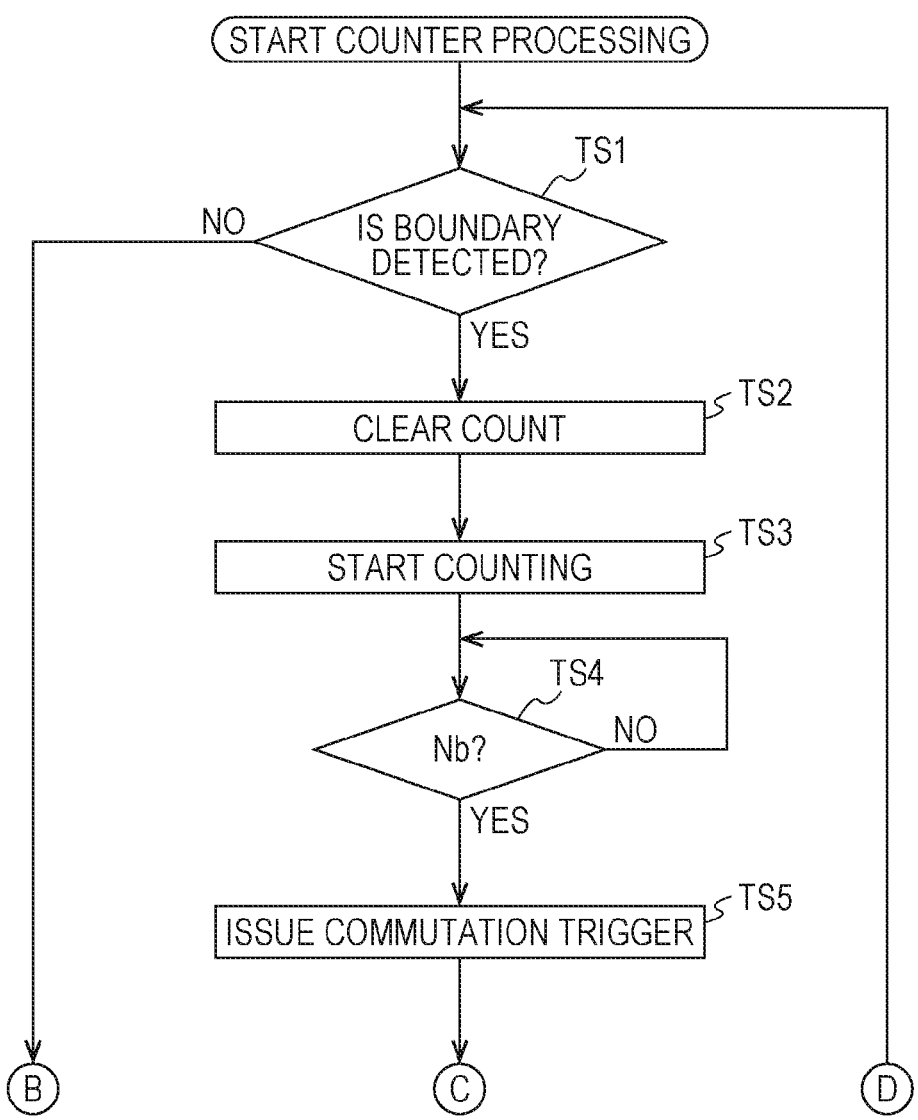
FIG. 9 is a flowchart related to issuing of a commutation trigger in control of a three-phase DC brushless motor according to an embodiment.

Next, how the control unit 50 gives a command for switching energization patterns (issue commutation trigger) based on counting by each counter will be described with reference to flowcharts in FIG. 9 and FIG. 10. Note that in the following, a command for switching energization patterns by utilization of the counter C1 will be described as an example in order to avoid an overlapped description. A command for switching energization patterns by utilization of a different counter is basically similar to the command for switching energization patterns by utilization of the counter C1.

Control related, to the command for switching energization patterns is started by activation of the counter C1.

In step TS1 of the control related to the command for switching energization patterns, the control unit 50 determines whether the Hall element 130 detects a boundary of a magnetic pole. For example, based on the boundary B5 of the magnetic pole which boundary is illustrated in FIG. 8 and passes through the position A1, it is determined whether the Hall element 130 detects the boundary B5 of the magnetic pole. When there is a detection signal from the Hall element 130, the present control goes to step TS2. When there is no detection signal, the control goes to step TS9. Note that simultaneously with the detection of the boundary B5 of the magnetic pole, the control unit 50 estimates time at which the boundary B5 of the magnetic pole reaches the positions A2 and A3.

In step TS2, the control unit 50 clears a count value of the counter C1.

In step TS3, the control unit 50 makes the counter C1 start counting.

In step TS4, the control unit 50 determines whether a count value of the counter C1 becomes a count value Nb. Here, the count value Nb is a value corresponding to time T3 estimated as time at which the boundary of the magnetic pole detected in the position A1 reaches the position A3. For example, in FIG. 8, the value corresponds to the time T3 estimated as time at which the boundary B5 of the magnetic pole reaches the position A3. When it is determined that the count value Nb is reached, the present control goes to step TS5. When it is determined that the count value Nb is not reached, waiting is performed in step TS4.

In step TS5, the control unit 50 gives a command for switching energization patterns (issue commutation trigger). Accordingly, for example, as illustrated in FIG. 8, an energization pattern that is the energization pattern P5 until the time T3 is switched to the energization pattern P6.

Figure 10:
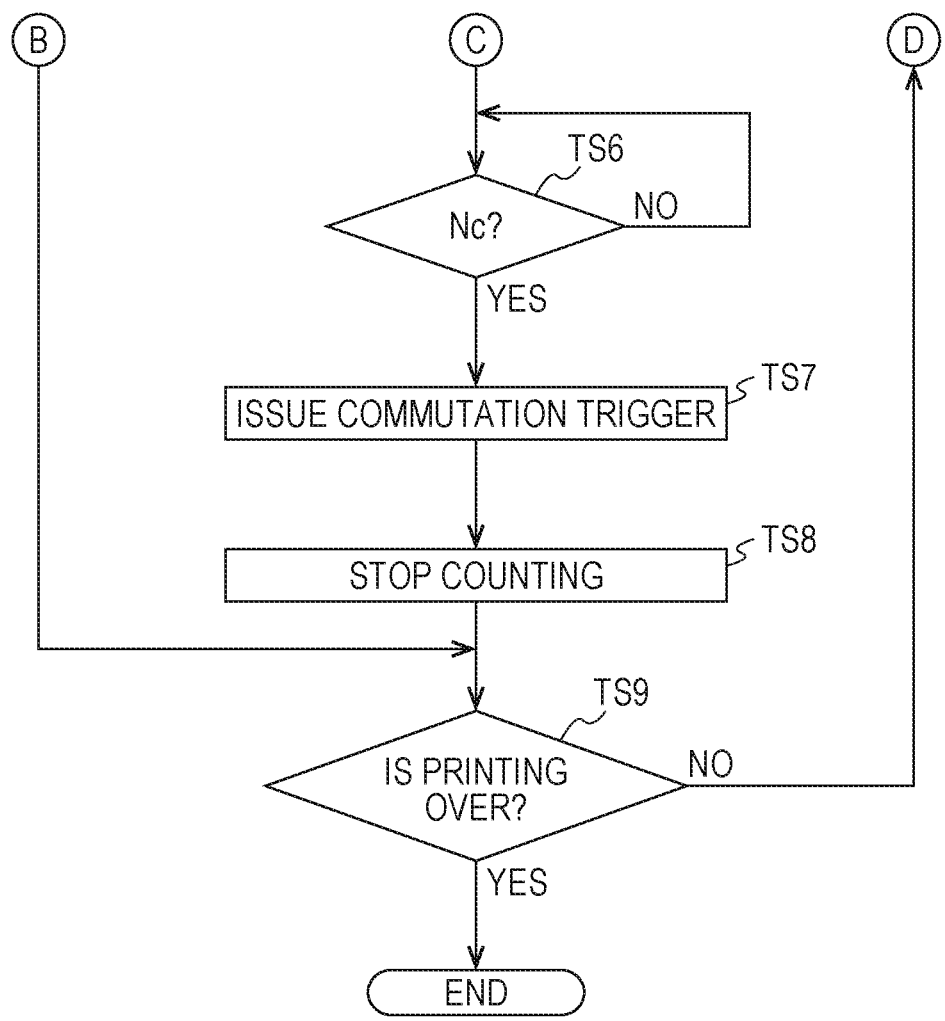
FIG. 10 is a flowchart related to issuing of a commutation trigger in control of a three-phase DC brushless motor according to an embodiment.

As illustrated in FIG. 10, in step TS6, the control unit 50 determines whether the count value or the counter C1 reaches a count value Nc. Here, the count value Nc is a value corresponding to time T2 estimated as time at which the boundary of the magnetic pole detected in the position A1 reaches the position A2. For example, in FIG. 8, the value corresponds to the time T2 estimated as time at which the boundary B5 of the magnetic pole reaches the position A2. When it is determined that the count value Nc is reached, the present control goes to step TS7. When it is determined that the count value Nc is not reached, waiting is performed in step TS6.

In step TS7, the control unit 50 gives a command for switching energization patterns (issue commutation trigger). Accordingly, for example, as illustrated in FIG. 8, an energization pattern that is the energization pattern P4 until the time T2 is switched to the energization pattern P5.

In step TS8, the control unit 50 stops the counting by the counter C1.

In step TS9, the control unit 50 determines whether the print job is over. When it is determined that the print job is over, the present control is ended. When the print job is not over, the present control goes back to step TS1.

Note that in a case where the present control goes back to step TS1, the control unit 50 makes the counter C1 starts counting again, for example, when the Hall element 130 detects a boundary of a new magnetic pole. Then, a cycle in which the control unit 50 switches the energization patterns at predetermined timing estimated as timing, at which the boundary of the new magnetic pole reaches the position A2 or A3, and stops the counter again is repeatedly performed until the print job is over.

Further, along with the counting by the counter C1, the counters C2 to C4 perform counting in a flow similar to the above. For example, in FIG. 8, the counter C2 is started when the Hall element 130 detects a boundary B6 of the magnetic pole which boundary passes through the position A1 after the boundary B5 of the magnetic pole. Then, at predetermined timing estimated as timing at which the boundary B6 of the magnetic pole reaches the position A2 or A3, the control unit 50 switches the energization patterns and then stops the counter C2. The above cycle is repeatedly performed not only by the counter C1 but also by each of the counters C2 to C4 until the print job is over.

Figure 11:
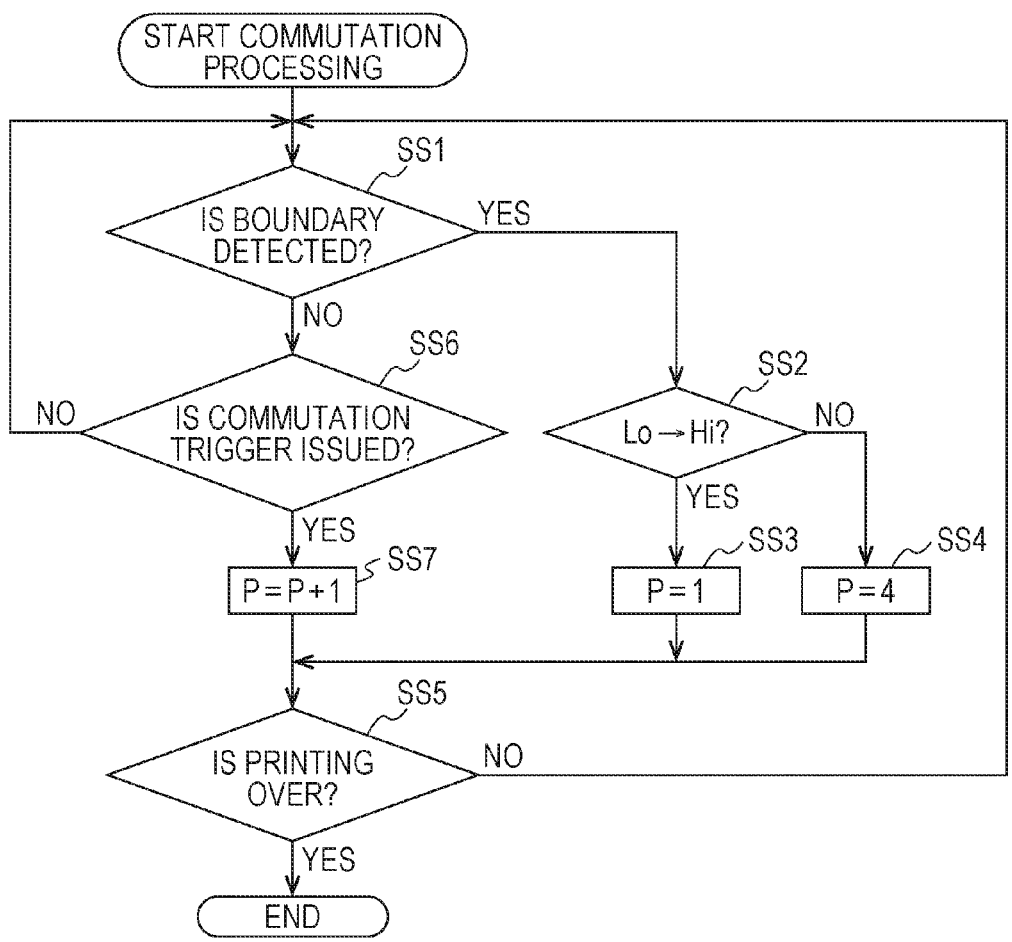
FIG. 11 is a flowchart related to selection of an energization pattern in control of a three-phase DC brushless motor according to an embodiment.

Next, how to select an appropriate energization pattern (hereinafter, referred to as energization pattern selection control) when a command for switching energization patterns is given from the control unit 50 will be described with reference to a flowchart illustrated in FIG. 11.

The energization pattern selection control is started when the control unit 50 rotates the three-phase DC brushless motor in a stationary energization state by the forced commutation (commutation processing).

In step SS1 of the energization pattern selection control, the control unit 50 determines whether the Hall element 130 detects a boundary of a magnetic pole. When there is a detection signal from the Hall element 130, the present control goes to step SS2. When there is no detection signal, the control goes to step SS6.

In step SS2, the control unit 50 detects whether a signal detected from the Hall element 130 is changed from Low to High. Here, Low is a signal output when a south pole of the rotor 120 passes through a vicinity of the Hall element 130 and High is a signal output when a north pole of the rotor 120 passes through the vicinity of the Hall element 130. When it is determined that the signal is changed from Low to High, the control goes to step SS3. When it is not determined in such a manner, that is, when the signal is changed from High to Low, the control goes to step SS4.

In step SS3, the control unit 50 makes a variable P, which indicates an energization pattern, into 1. The variable P turned into 1 means that the energization pattern P1 is executed. Note that a case where the signal is changed from Low to High which case is a condition for transition from step SS2 to step SS3 indicates that boundaries B1, B3, B5, and B7 in FIG. 8 are detected.

In step SS4, the control unit 50 turns a variable P, which indicates an energization pattern, into 4. The variable P turned into 4 means that the energization pattern P4 is executed. Note that a case where the signal is changed from High to Low which case is a condition for transition from step SS2 to step SS4 indicates that boundaries B2, B4, B6, and B8 in FIG. 8 are detected.

In step SS5, the control unit 50 determines whether the print job is over. When it is determined that the print job is over, the present control is ended. When the print job is not over, the present control goes back to step SS1.

In step SS6, when the control unit 50 gives a command for switching energization patterns (issue commutation trigger), the present control goes to step SS7. When the command for switching energization patterns is not given, the control goes back to step SS1.

In step SS7, the control unit 50 adds one to a variable P until that time which variable indicates an energization pattern. For example, when the variable P until that time is 1, the variable P becomes 2 in step SS7. The variable P turned into 2 means that the energization pattern P2 is executed. Then, the present control goes to step SS5. When the print job is ended, the control is ended. When the print job is kept performed, the control goes back to step SS1.

(Effect)

In a control method for a three-phase DC brushless motor 100 of an embodiment, it is possible to switch magnetic fields, which are generated by coils of a stator, at timing suitable for a rotation of the rotor 120 and to control rotation irregularity compared to a control method for a three-phase DC brushless motor in a related art. In the following, a detail description will be made.

In a control method for a three-phase DC brushless motor in a related art, for example, when a boundary B1 of a magnetic pole of a rotor 120 passes through a position A1, positions of magnetic poles that pass through positions A2 and A3 are estimated on the assumption that the magnetic poles of the rotor 120 are arranged at equal intervals.

Figure 12:
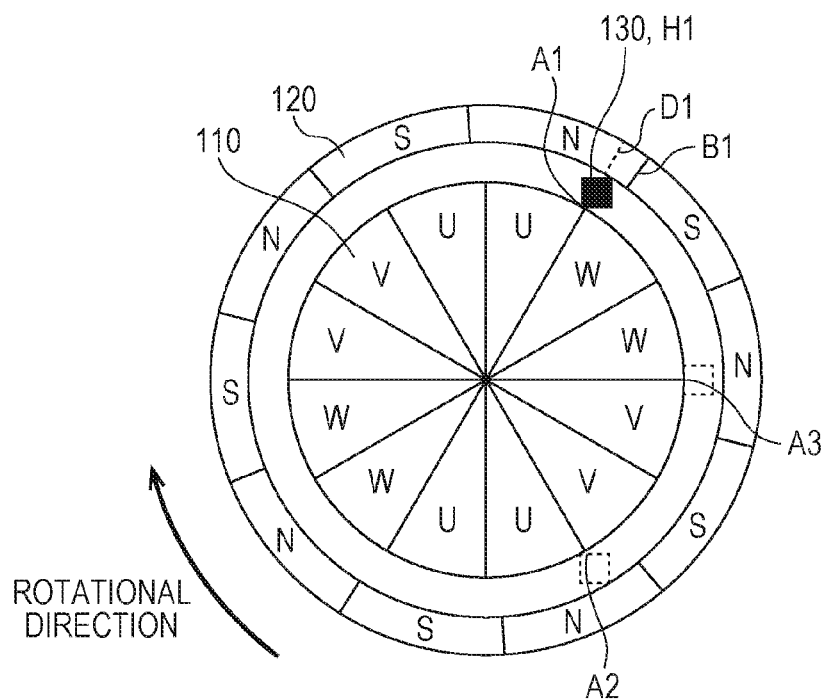
FIG. 12 is a schematic view illustrating a case where positions of magnetic poles are not at equal intervals in a three-phase DC brushless motor.

However, actually, the magnetic poles of the rotor 120 are not necessarily at equal intervals. For example, positions of the magnetic poles vary for about ±10%. Thus, as illustrated in FIG. 12, in a case where the boundary B1 of the magnetic pole is deviated from a designed position D1 of the rotor 120 to one side in a rotational direction, when a position of a different magnetic pole that passes through position A2 or A3 is estimated based on this positional information on the assumption that magnetic poles of the rotor 120 are arranged at equal intervals, the position of the different magnetic pole is deviated from an actual position to one side.

Figure 13:
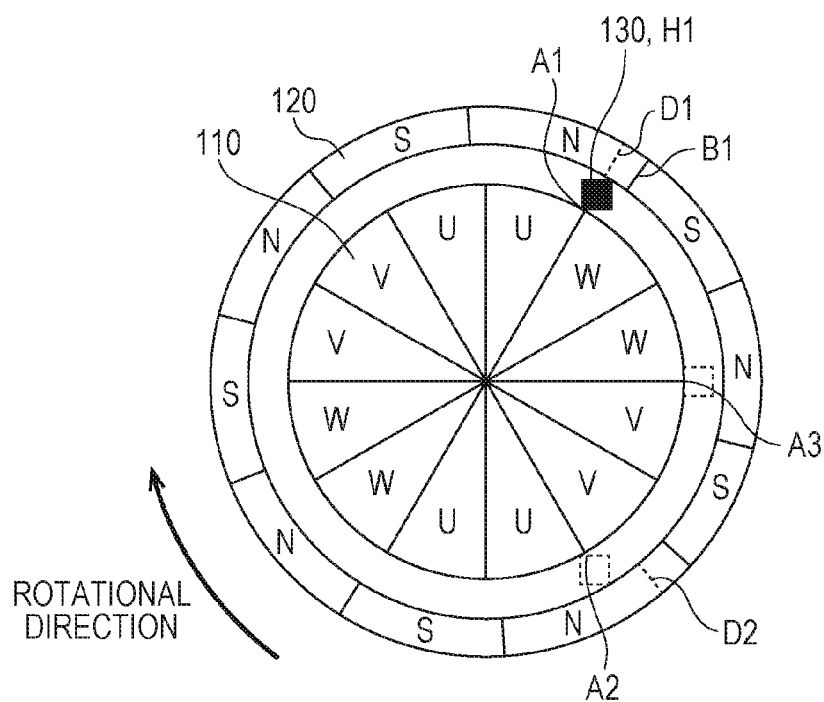
FIG. 13 is a schematic view illustrating a case where positions of magnetic poles are not at equal intervals in a three-phase DC brushless motor.

However, as illustrated in FIG. 13, a position of the boundary B1 of the magnetic pole is deviated from the designed position D1 to one side in the rotational direction. When the boundary of the different magnetic pole is deviated from a designed position D2 to the other side in the rotational direction, a deviation between an estimated position of the different magnetic pole and an actual position of the different magnetic pole is increased.

On the other hand, in the control method for a three-phase DC brushless motor of an embodiment, for example, when positional information of a boundary B1 of a magnetic pole of a rotor 120 which boundary passes through a position A1 is acquired, a control unit 50 estimates time until the boundary B1 of the magnetic pole reaches a position A2. Then, based on this estimated value, energization with respect to coils of a stator 110 is switched at time estimated as time at which the boundary B1 of the magnetic pole reaches the position A2. In this method, unlike the control method for a three-phase DC brushless motor in a related art, a position of a different magnetic pole is not estimated from positional information of a certain magnetic pole. Thus, there is no influence from a magnetization variation of a rotor. Thus, in the control method for a three-phase DC brushless motor of an embodiment, it is possible to switch magnetic fields, which are generated by coils of a stator, at timing suitable for a rotation of the rotor and to control rotation irregularity.

Further, since the three-phase DC brushless motor 100 can control rotation irregularity, it is possible to control generation of irregularity in a pitch in the image forming device when the three-phase DC brushless motor 100 is used for the intermediate transfer belt 22 or the photoreceptor drum 11.

First Modification Example

A main difference between a control method for a three-phase DC brushless motor according to a first modification example and a control method for a three-phase DC brushless motor of an embodiment is the number of counters used to estimate a position of a magnetic pole. In the following, a detail description will be made.

Figure 14:
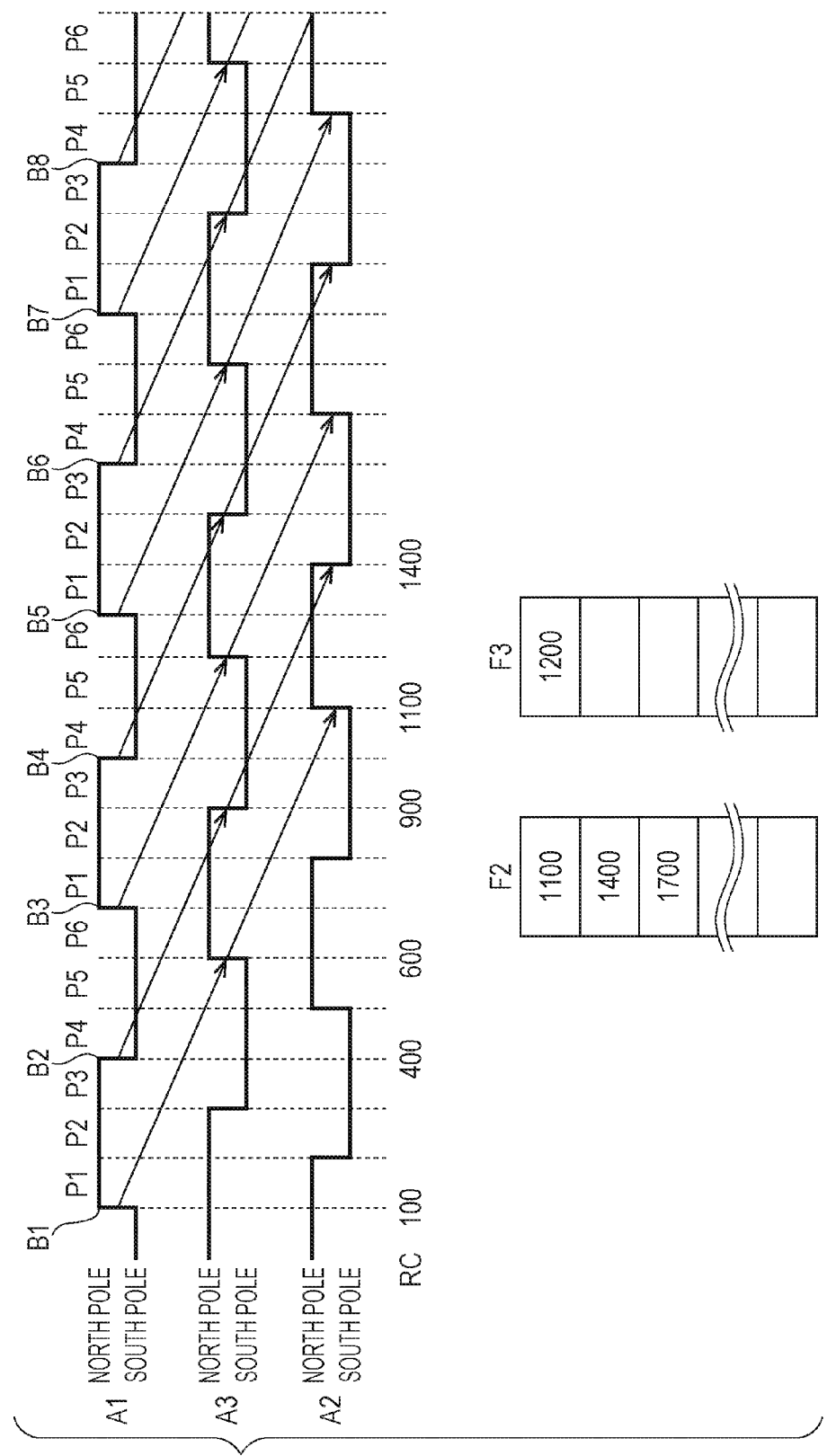
FIG. 14 is a timing chart illustrating a count value of a free-run counter and an example of writing of the count value into a FIFO memory in control of a three-phase DC brushless motor according to a first modification example.

(Outline of Control of Three-Phase DC Brushless Motor According to First Modification Example, see FIG. 14)

In the control method for a three-phase DC brushless motor according to the first modification example, one free-run counter RC that presents elapse of time by counting up in a certain time interval, a first in first out (FIFO) memory F2 for a position A2, and a FIFO memory F3 for a position A3 are used.

In the control method for a three-phase DC brushless motor according to the first modification example, the free-run counter RC constantly operates. For example, as illustrated in FIG. 14, it is assumed that a boundary B1 passes through a position A1 when a count value of the free-run counter RC is 100. At time substantially simultaneous with this passing, a control unit 50 estimates time, at which the boundary B1 passes through a position A2, and writes a count value of the free-run counter RC which value corresponds to this time into the FIFO memory F2. Note that in the present embodiment, since commutation processing is performed when the count value of the free-run counter RC becomes equal to or larger than 1000, a value smaller than 1000 is not written into each of the FIFO memories.

More specifically, with reference to an example illustrated in FIG. 14, a count value of the free-run counter RC, which value corresponds to time at which the boundary B1 passes through the position A2, is 1100 and this count value is written into the FIFO memory F2.

Next, when the boundary B2 passes through the position A1 when the count value of the free-run counter RC is 400, the control unit 50 estimates time at which the boundary B2 passes through the position A2 and writes a count value of the free-run counter RC which value corresponds to this time into the FIFO memory F2.

More specifically, with reference to the example illustrated in FIG. 14, a count value of the free-run counter RC, which value corresponds to time at which a boundary B2 passes through the position A2, is 1400 and this count value is written into the FIFO memory F2 after 1100 that is written in the above.

Moreover, in a case where a boundary B3 passes through the position A1 when the count value of the free-run counter RC is 700, the control unit 50 estimates time, at which the boundary B3 passes through positions A2 and A3, and writes a count value of the free-run counter RC which value corresponds to this time. For example, 1700 is written into the FIFO memory F2 and 1200 is written into the FIFO memory F3.

Then, in a case where a boundary B4 passes through the position A1 when the count value of the free-run counter RC is 1000, the control unit 50 estimates time, at which the boundary B4 passes through the positions A2 and A3, and writes a count value of the free-run counter RC which value corresponds to this time.

Moreover, when the count value of the free-run counter RC becomes 1100, the control unit 50 reads the value 1100 written into the FIFO memory F2 and gives a command for switching energization patterns.

Then, when the count value of the free-run counter RC becomes 1200, the control unit 50 reads the value 1200 written into the FIFO memory F3 and gives a command for switching energization patterns.

In such a manner, in the control method for a three-phase DC brushless motor according to the first modification example, the control unit 50 gives a command for switching energization patterns based on a count value of one counter and a value that indicates timing for switching energization and that is stored in each FIFO memory.

(Detail of Control of Three-Phase DC Brushless Motor According to First Modification Example, see FIG. 14 to FIG. 18)

Next, a main flow of control of the three-phase DC brushless motor according to the first modification example will be described with reference to FIG. 14 to FIG. 18. Note that since a configuration in the control unit 50 and a configuration of the inverter circuit 140 related to control of the three-phase DC brushless motor according to the first modification example are similar to those related to the control of the three-phase DC brushless motor of the embodiment, a description thereof is omitted here.

Figure 15:
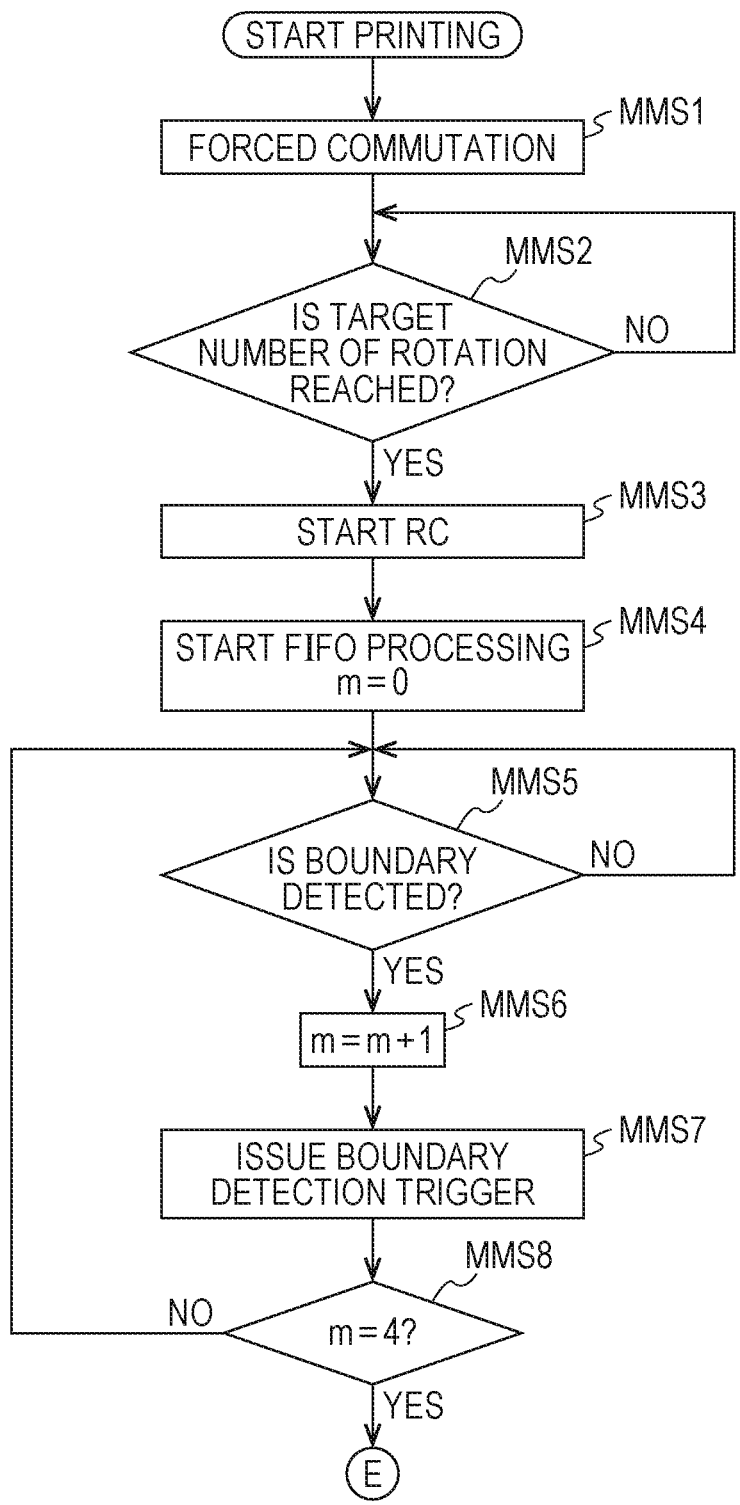
FIG. 15 is a main flowchart of control of the three-phase DC brushless motor according to the first modification example.

As illustrated in FIG. 15, a main flow of control of the three-phase DC brushless motor according to the first modification example is also started when execution of a new print job is determined.

In step MMS1 of the main flow of the control of the three-phase DC brushless motor according to the first modification example, the control unit 50 performs forced commutation with respect to the three-phase DC brushless motor 100.

In step MMS2, the control unit 50 determines whether the number of rotations of the three-phase DC brushless motor 100 reaches the target number of rotations. When the target number of rotations is reached, the present control goes to step MMS3. When it is determined that the target number of rotations is not reached, the present control holds in step MMS2.

In step MMS3, the control unit 50 activates the free-run counter RE and makes the free-run counter RC start counting.

In step MMS4, the control unit 50 brings a FIFO memory into a writable state (start FIFO processing). Simultaneously, a variable m that is counted up each time a boundary of a magnetic pole of the rotor 120 is detected is turned into 0.

In step MMS5, the control unit 50 determines whether a boundary of a magnetic pole passes through the position A1, that is, whether the Hall element 130 detects a boundary of a magnetic pole. When there is a detection signal from the Hall element 130, the present control goes to step MMS6. When there is no detection signal, waiting is performed in step MMS5.

In step MMS6, the variable m is changed from m=0 into m=1. More specifically, processing that is m=m+1 is performed and the variable is changed from m=0 into m=1.

In step MMS7, the control unit 50 outputs a signal indicating that a boundary of a magnetic pole passes through the position A1 (issue boundary detection trigger).

In step MMS8, the control unit 50 determines whether the variable m is 4. When the variable m is 4, the present control goes to step MMS9. When the variable m is other than 4, the present control goes back to step MMS5. Note that as described above, a reason why the present control does not go to step MMS9 until the variable m becomes 4, that is, a reason why steps from MMS5 to MMS8 are repeated for four times is that it is not possible to estimate timing, at which a boundary of each magnetic pole passes through the position A2, before the boundary of the magnetic pole passes through the position A1 for four times as illustrated in FIG. 14, for example.

Figure 16:
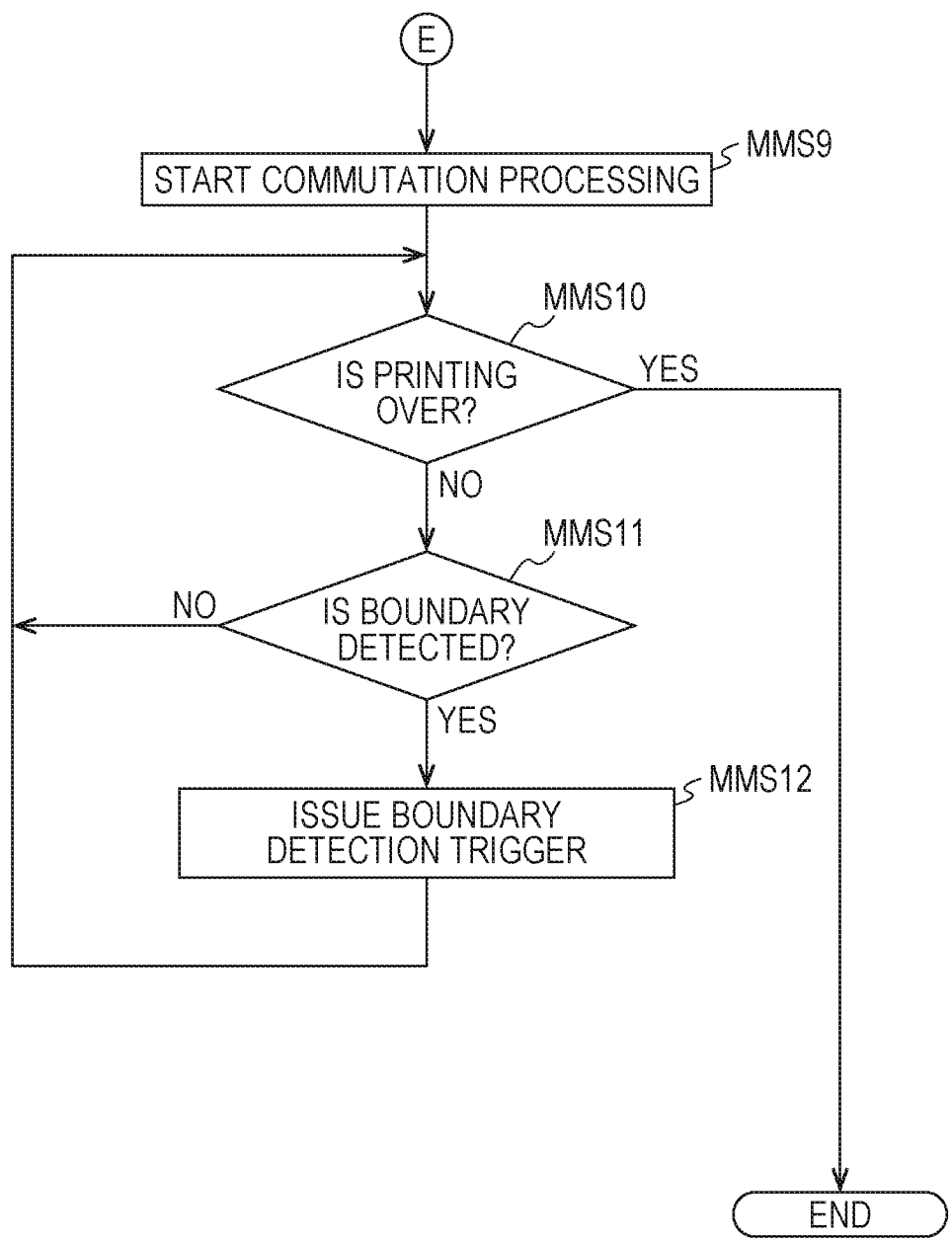
FIG. 16 is a main flowchart of control of the three-phase DC brushless motor according to the first modification example.

As illustrated in FIG. 16, in step MMS9, the control unit 50 rotates the three-phase DC brushless motor in a stationary energization state (commutation processing). That is, the control unit 50 reads a count value of the free-run counter RC and values written into the FIFO memories F2 and F3, selects an appropriate energization pattern at time estimated as time at which a boundary of each magnetic pole reaches the position A2 or position A3, and rotates the three-phase DC brushless motor. Note that how to select an appropriate energization pattern will be described later.

In step MMS10, the control unit 50 determines whether the print job is over. When it is determined that the print job is over, the present control is ended. When the print job is not over, the present control goes to step MMS11.

In step MMS11, the control unit 50 determines whether a boundary of a new magnetic pole passes through, that is, whether the Hall element 130 detects a boundary of a magnetic pole. When there is a detection signal from the Hall element 130, the present control goes to step MMS12. When there is no detection signal, the control goes back to step MMS10.

In step MMS12, since the Hall element 130 detects a boundary of a new magnetic pole, the control unit 50 respectively writes, into the FIFO memories F2 and F3, count values of the free-run counter RC which values correspond to time at which the boundary of the new magnetic pole passes through the positions A2 and A3. Simultaneously, a signal indicating that the boundary of the magnetic pole passes through the position A1 is output (boundary detection trigger is issued). Then, the present control goes back to step MMS10.

Next, a flow related to detection of a boundary of a magnetic pole and writing of a value into a FIFO memory (hereinafter referred to as writing control) will be described.

Figure 17:
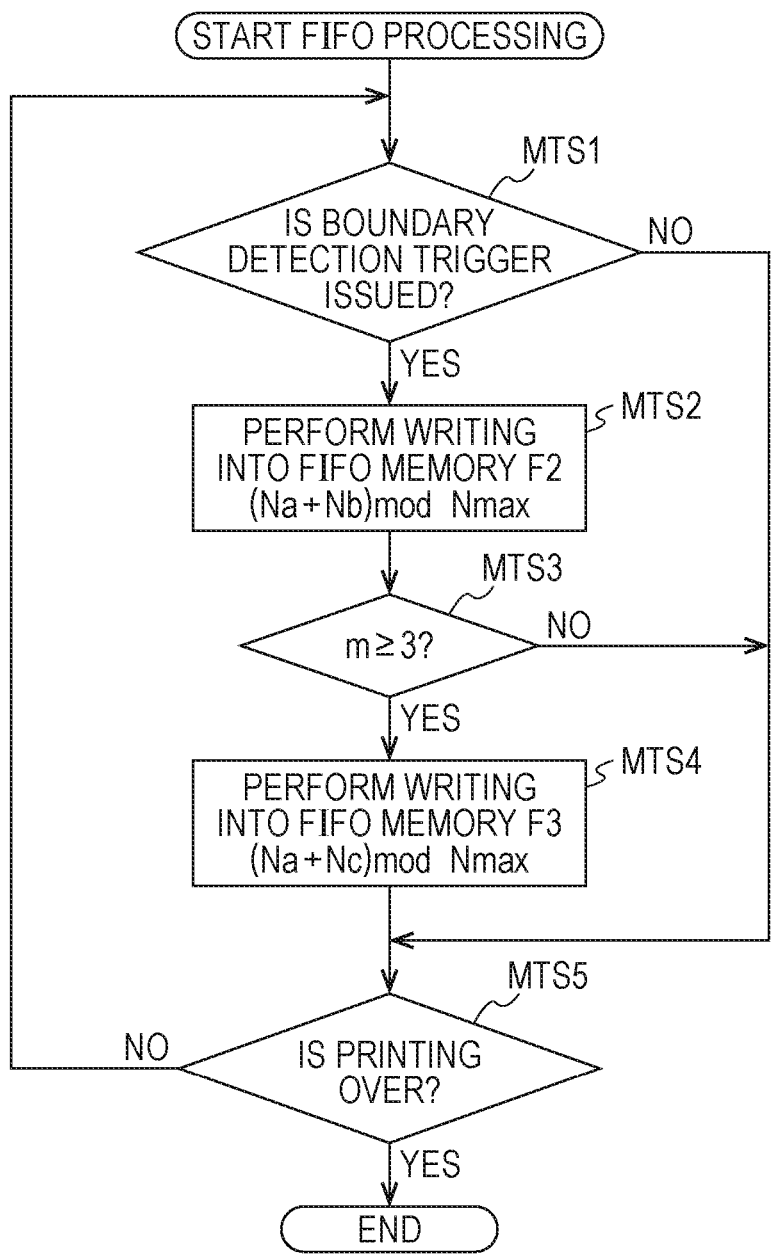
FIG. 17 is a flowchart related to writing into the FIFO memory in control of the three-phase DC brushless motor according to the first modification example.

As illustrated in FIG. 17, the writing control is started when the control unit 50 brings the FIFO memory into a writable state (FIFO processing).

In step MTS1 of the writing control, the control unit 50 determines whether a boundary detection trigger is issued. When the boundary detection trigger is issued, the present control goes to step MTS2. When no boundary detection trigger is issued, the control goes to step MTS5.

In step MTS2, the control unit 50 estimates time, at which a boundary of a new magnetic pole passes through the position A2, and writes a count value of the free-run counter RC which value corresponds to the time into the FIFO memory F2. More specifically, a value Fb that is calculated from a remainder calculation of (Na+Nb) mod Nmax with a count value of the free-run counter RC which value corresponds to time at which the boundary of the new magnetic pole passes through the position A1 as Na, a count value of the free-run counter RC which value corresponds to time until the boundary of the new magnetic pole reaches the position A2 as Nb, and a maximum value that can be counted by the free-run counter RC as Nmax is written into the FIFO memory F2. Here, a reason why the remainder calculation is performed is to deal with a case where a value (Na+Nb) of the free-run counter RC exceeds an upper limit value of the free-run counter RC. When counting up to the upper limit value, the free-run counter RC starts counting again from 0.

In step MTS3, the control unit 50 determines whether the variable m, which is counted up each time a boundary of a magnetic pole of the rotor 120 is detected, is equal to or larger than 3. This is because a value of the free-run counter RC which value is equal to or larger than 1000 is stored into the FIFO memory F3 in this modification example.

In step MTS4, the control unit 50 estimates time, at which the boundary of the new magnetic pole passes through the position A3, and writes a count value of the free-run counter RC which value corresponds to the time into the FIFO memory F3. More specifically, a value Fc calculated from a remainder calculation of (Na+Nc) mod Nmax with a count value of the free-run counter RC, which value corresponds to time until a boundary of a new magnetic pole reaches the position A3, as Nc is written into the FIFO memory F3. Note that a reason why the remainder calculation is performed is similar to the above.

In step MTS5, the control unit 50 determines whether the print job is over. When it is determined that the print job is over, the present control is ended. When the print job is not over, the present control goes back to step MTS1.

Figure 18:
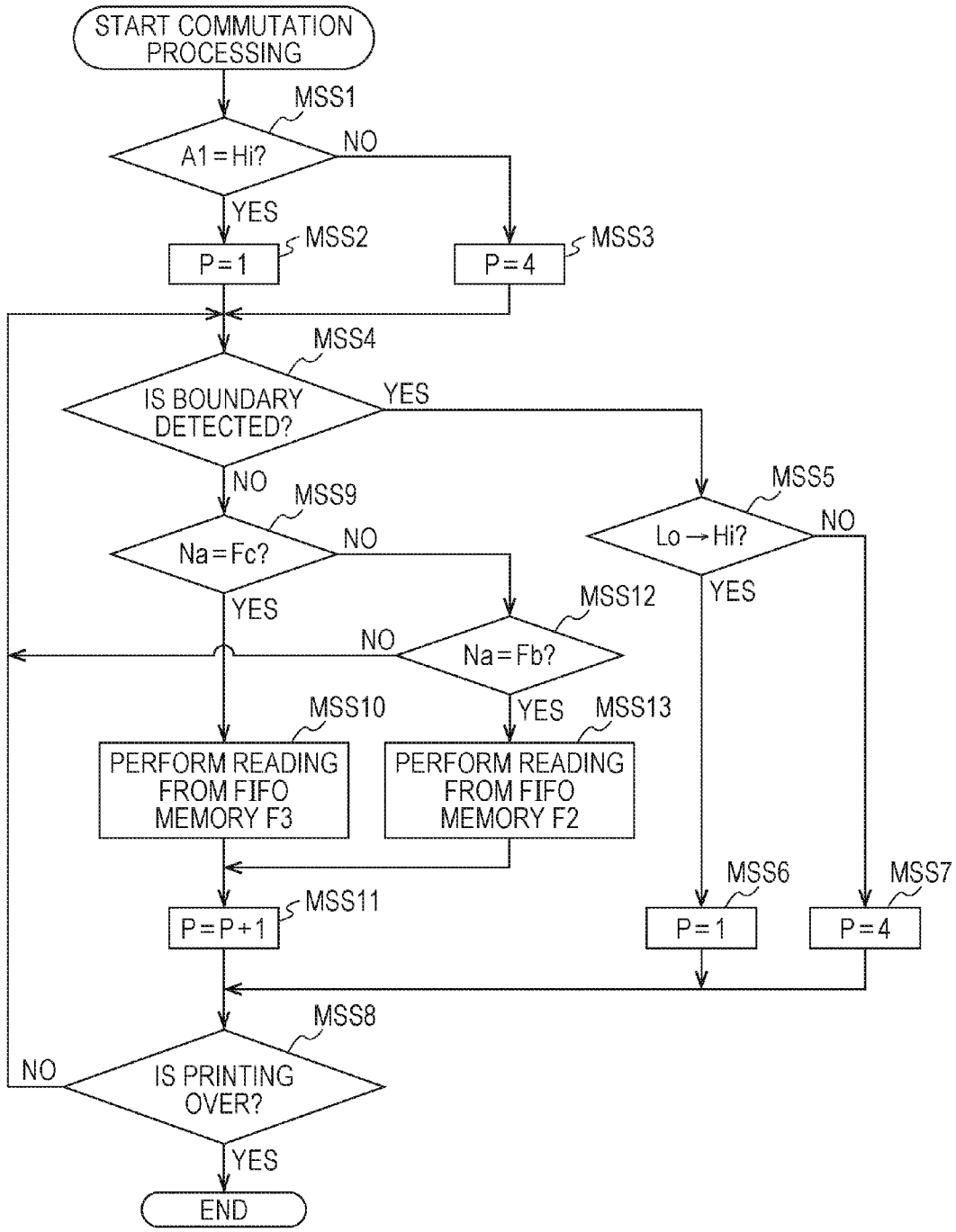
FIG. 18 is a flowchart related to selection of an energization pattern in control of the three-phase DC brushless motor according to the first modification example.

Next, how to select an appropriate energization pattern with a FIFO memory (hereinafter, referred to as energization pattern selection control with FIFO memory) when a command for switching energization patterns is given from the control unit 50 will be described with reference to a flowchart illustrated in FIG. 18.

The energization pattern selection control with the FIFO memory is started when the control unit 50 rotates the three-phase DC brushless motor in a stationary energization state by forced commutation (commutation processing).

In step MSS1 of the energization switching control, the control unit 50 determines whether a signal currently detected from the Hall element 130 is High or Low. When the signal is High, the present control goes to step MSS2. When the signal is Low, the control goes to step MSS3.

In step MSS2, the control unit 50 turns a variable P, which indicates an energization pattern, into 1.

In step MSS3, the control unit 50 turns the variable P, which indicates an energization pattern, into 4.

In step MSS4, the control unit 50 determines whether the Hall element 130 detects a boundary of a magnetic pole. When there is a detection signal from the Hall element 130, the present control goes to step MSS5. When there is no detection signal, the control goes to step MSS9.

In step MSS5, the control unit 50 detects whether a signal detected from the Hall element 130 is changed from Low to High. When it is determined that the signal is changed from Low to High, the control goes to step MSS6. When it is not determined in such a manner, that is, when the signal is changed from High to Low, the control goes to step MSS7.

In step MSS6, the control unit 50 turns the variable P, which indicates an energization pattern, into 1.

In step MSS7, the control unit 50 turns the variable P, which indicates an energization pattern, into 4.

In step MSS8, the control unit 50 determines whether the print job is over. When it is determined that the print job is over, the present control is ended. When the print job is not over, the present control goes back to step MSS4.

In step MSS9, it is determined whether the count value Na of the free-run counter RC is the value Fc corresponding to the time at which the boundary of the magnetic pole passes through the position A3. In a case where the count value Na of the free-run counter RC is the value Fc, the present control goes to step MSS10. In other cases, the control goes to step MSS12.

In step MSS10, the control unit 50 reads the oldest value written in the FIFO memory F3 and deletes the value from the FIFO memory F3.

In step MSS11, the control unit 50 adds one to the variable P until that time which value indicates an energization pattern. For example, when the variable P until that time is 1, the variable P becomes 2 in step MSS11. Then, the present control goes to step MSS8. When the print job is ended, the control is ended. When the print job is kept performed, the control goes back to step MSS4.

In step MSS12, it is determined whether the count value Na of free-run counter RC is the value Fb corresponding to the time at which the boundary of the magnetic pole passes through the position A2. In a case where the count value of the free-run counter RC is the value Fb, the present control goes to step MSS13. In other cases, the control goes back to step MSS4.

In step MSS13, the control unit 50 reads the oldest value written in the FIFO memory F2 and deletes the value from the FIFO memory F2. Then, the present control goes to step MSS11.

As described above, in the control method for a three-phase DC brushless motor according to the first modification example, the control unit 50 gives a command for switching energization patterns based on a count value of one counter and a value that indicates timing for switching energization and that is stored in each FIFO memory. Thus, unlike the control method for a three-phase DC brushless motor of the embodiment, it is not necessary to use a plurality of counters. It is possible to reduce an operation amount of a CPU to operate a counter.

Figure 19:
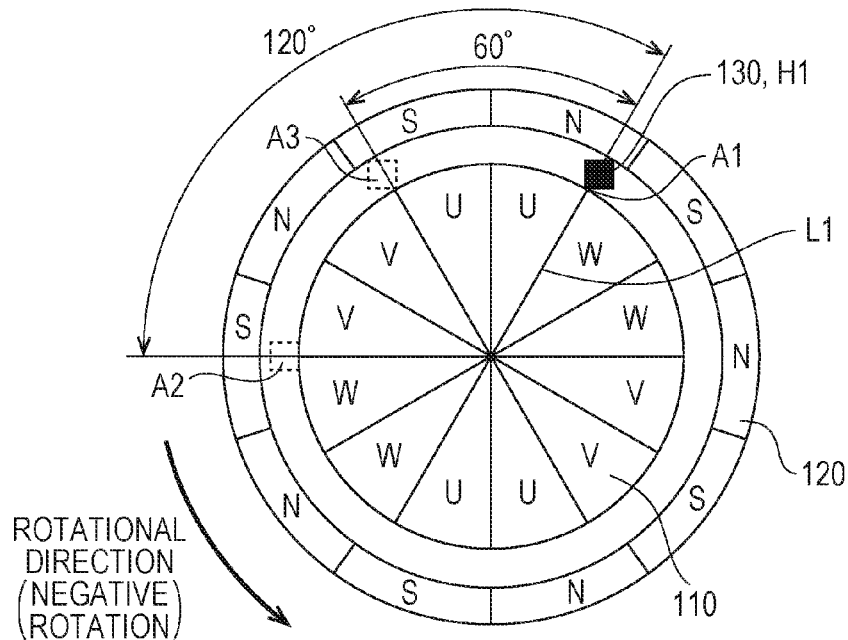
FIG. 19 is a schematic view illustrating a configuration of a three-phase DC brushless motor according to a second modification example.
Figure 20:
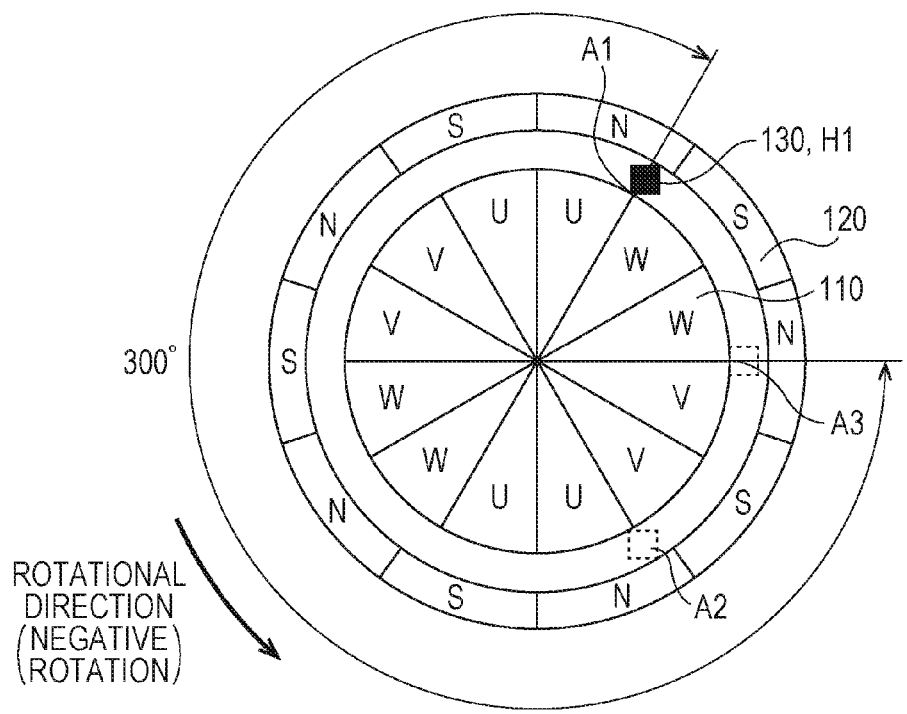
FIG. 20 is a schematic view illustrating a configuration of a three-phase DC brushless motor according to a comparison example.
Figure 21:
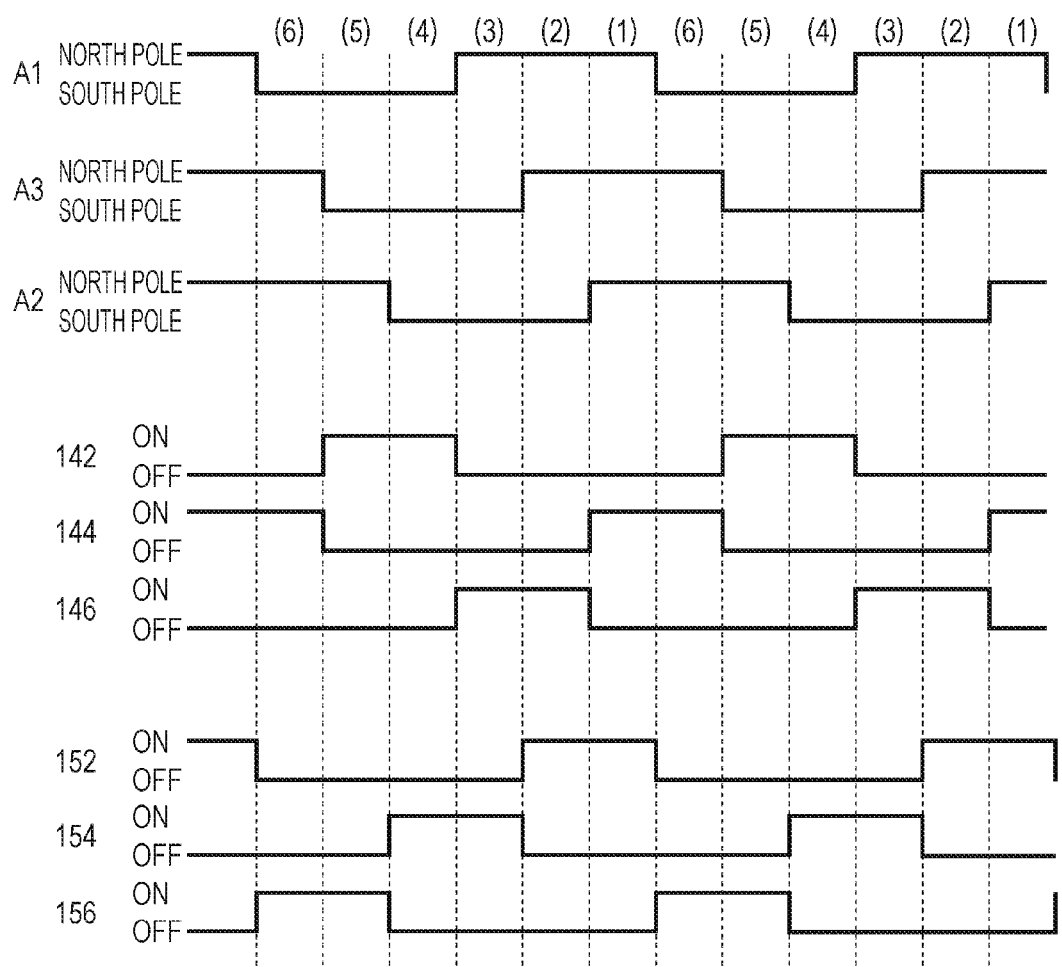
FIG. 21 is a timing chart illustrating an energization pattern of when a signal from a Hall element during an inverse rotation of a three-phase DC brushless motor is received without inversion.

Second Modification Example, See FIG. 19 to FIG. 21

A control method for a three-phase DC brushless motor according to the second modification example is different from the control method for a three-phase DC brushless motor according to the embodiment in a point that positions A2 and A3 used in estimation of passing time of a boundary of a magnetic field in an inverse rotation (counterclockwise rotation) of a motor are set to places different from those in a case of a positive rotation (clockwise rotation) and a point that a detection signal from a Hall element 130 is inverted.

As illustrated in FIG. 19, in the control method for a three-phase DC brushless motor according to the second modification example, a place where a position A2 is set in an inverse rotation of a motor is set to a place symmetrical, in a direction of a rotary shaft, with a place of a position A2 in a case of a positive rotation with a straight line L1, which connects a position A1 and a center point of a rotation of a rotor 120, as an axis of symmetry. A position A3 is in a similar manner.

With such setting, it is possible to reduce the number of counters or a size of a FIFO memory. More specifically, for example, as illustrated in FIG. 20, in an inverse rotation, when the positions A2 and A3 are set to places that are the same with those in a positive rotation, a distance from the position A1 to the position A3 corresponds to a distance in which the rotor 120 is rotated for 300°. In this case, in a control method for a three-phase DC brushless motor which method is an embodiment and which method uses a plurality of counters, four counters are necessary in the positive rotation and nine counters are necessary in the inverse rotation. Further, in a control method for a three-phase DC brushless motor which method is the first modification example, it is necessary to make a storage capacity necessary for a FIFO memory in the inverse rotation larger than that in the positive rotation.

On the other hand, as illustrated in FIG. 19, when places of the positions A2 and A3 in the inverse rotation are set to places that are symmetrical with places of the positions A2 and A3 in the positive rotation with the straight line L1, which connects the position A1 and the center point of the rotation of the rotor 120, as an axis of symmetry, a distance from the position A1 to the position A3 corresponds to a distance in which the rotor 120 is rotated for 60° and a distance from the position A1 to the position A2 corresponds to a distance in which the rotor 120 is rotated for 120°. In this case, it is possible to make the number of necessary counters or a storage capacity of a FIFO memory identical to that in the positive rotation.

Further, as illustrated in FIG. 21, in the inverse rotation of the motor, a signal detected from a Hall element 130 is inverted, with respect to that in the positive rotation. Thus, in the control method for a three-phase DC brushless motor according to the second modification example, the positions A2 and A3 are set to places different from those in the positive rotation (clockwise rotation) and a detection signal from the Hall element 130 is inverted (logical inversion), whereby a detection signal identical to that in the positive rotation is acquired. As a result, according to the control method for a three-phase DC brushless motor of the second modification example, an energization pattern identical to that in the positive rotation can be also used in the inverse rotation.

Different Embodiment

A control method for a three-phase DC brushless motor, and a photoreceptor drum, a transfer belt, and an image forming device to which a three-phase DC brushless motor having the control method is attached are not limited to the above embodiment and can be modified in various manners within the spirit and the scope thereof. For example, the number of magnetic poles of a rotor and the number of slots of a stator are arbitrarily determined. Accordingly, the number of counters used in a control method for a three-phase DC brushless motor and a size of a FIFO memory are arbitrarily determined. Further, a control method for a three-phase DC brushless motor according to an embodiment of the present invention can be used for a three-phase DC brushless motor provided in a device other than an image forming device. Moreover, embodiments can be combined.

As described above, an embodiment of the present invention is useful for a control method for a three-phase DC brushless motor in which method a rotation of the three-phase DC brushless motor is controlled based on information of one position sensor. Specifically, the embodiment of the present invention is better than a control method for a three-phase DC brushless motor in a related, art in a point that rotation irregularity can be controlled.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A control method for a three-phase DC brushless motor including a rotor that includes a plurality of magnetic poles and that is rotatable, a stator that includes a plurality of magnetic field generation parts to generate a magnetic field to be a driving source of the rotor, and a sensor to detect a magnetic pole of the rotor which pole passes through a first position in the stator, the method comprising:
rotating the rotor at least a target number of rotations;
detecting a first magnetic pole of the rotor when the first magnetic pole passes through the first position;
estimating, based on a result of the detection of the first magnetic pole, time until the first magnetic pole reaches a second position in the stator; and
controlling, based on a result of the estimation of the time until the second position is reached, the plurality of magnetic field generation parts in such a manner that a suitable magnetic field is generated when the first magnetic pole passes through the second position.

2. The control method for a three-phase DC brushless motor according to claim 1, further comprising:
first count starting in which counting by a first counter is started with time, at which the sensor detects the first magnetic pole passing through the first position, as first reference time;
a first estimation of the time from the first reference time until the first magnetic pole reaches the second position in the stator;
controlling, based on the estimated time, the plurality of magnetic field generation parts in such a manner that a suitable magnetic field is generated when the first magnetic pole passes through the second position;
second count starting in which counting by a second counter is started with time, at which the sensor detects a second magnetic pole of the rotor which magnetic pole passes through the first position, as second reference time;
a second estimation of the time from the second reference time to time until the second magnetic pole reaches the second position in the stator; and
controlling, based on the time until the second magnetic pole reaches the second position in the stator which time is estimated in the second estimating, the plurality of magnetic field generation parts in such a manner that a suitable magnetic field is generated when the second magnetic pole passes through the second position.

3. The control method for a three-phase DC brushless motor according to claim 1, further comprising:
activating a free-run counter that presents elapse of time by counting up in a certain time interval;
acquiring a first value of the free-run counter in a case where the sensor detects the first magnetic pole passing through the first position;
calculating, based on the first value, a second value of the free-run counter which value corresponds to time at which the first magnetic pole passes through the second position in the stator; and
controlling, in a case where a value of the free-run counter becomes a second value, the plurality of magnetic field generation parts in such a manner that a suitable magnetic field is generated when the first magnetic pole passes through the second position.

4. The control method for a three-phase DC brushless motor according to claim 1, wherein
the rotor is rotatable in both of a clockwise direction and a counterclockwise direction, and
when the rotor is rotated in the counterclockwise direction, the plurality of magnetic field generation parts is controlled on the assumption that a second position in the stator is in a position symmetrical, in a direction of a rotary shaft of the rotor, with a second position in the stator in a case where the rotor is rotated in the clockwise direction, a straight line which connects the first position and a center point of a rotation of the rotor being an axis of symmetry.

5. The control method for a three-phase DC brushless motor according to claim 4, wherein
when a signal from the sensor is received and a control unit, which is configured to estimate time until the first magnetic pole reaches the second position in the stator, rotates the rotor in the counterclockwise direction, the signal received from the sensor is inverted and read.

6. A control device comprising:
a control circuit configured to control a three-phase DC brushless motor including a rotor that includes a plurality of magnetic poles and that is rotatable, a stator that includes a plurality of magnetic field generation parts to generate a magnetic field to be a driving source of the rotor, and a sensor to detect a magnetic pole of the rotor which magnetic pole passes through a first position in the stator, wherein the control circuit
rotates the rotor at least a target number of rotations;
acquires a result of detection, which is performed by the sensor, of a first magnetic pole of the rotor which magnetic pole passes through the first position,
estimates, based on the result of the detection of the first magnetic pole, time until the first magnetic pole reaches a second position in the stator, and
controls, based on a result of the estimation of the time until the second position is reached, the plurality of magnetic field generation parts in such a manner that a suitable magnetic field is generated when the first magnetic pole passes through the second position.

7. The control device according to claim 6, wherein
the control circuit makes a first counter start counting with time, at which the sensor detects the first magnetic pole passing through the first position, as first reference time,
estimates the time from the first reference time to time until the first magnetic pole reaches the second position in the stator,
controls the plurality of magnetic field generation parts based on the first time in such a manner that a suitable magnetic field is generated when the first magnetic pole passes through the second position,
makes a second counter start counting with time, at which the sensor detects a second magnetic pole of the rotor which magnetic pole passes through the first position, as second reference time,
estimates second time from the second reference time to time until the second magnetic pole reaches the second position in the stator, and
controls the plurality of magnetic field generation parts based on the second time in such a manner that a suitable magnetic field is generated when the second magnetic pole passes through the second position.

8. The control device according to claim 6, wherein
the control circuit activates a free-run counter that presents elapse of time by counting up in a certain time interval,
acquires a first value of the free-run counter in a case where the sensor detects the first magnetic pole passing through the first position,
calculates, based on the first value, a second value of the free-run counter which value corresponds to time at which the first magnetic pole passes through the second position in the stator, and
controls, when a value of the free-run counter becomes the second value, the plurality of magnetic field generation parts in such a manner that a suitable magnetic field is generated in a case where the first magnetic pole passes through the second position.

9. The control device according to claim 6, wherein
the rotor is rotatable in both of a clockwise direction and a counterclockwise direction, and
when the rotor is rotated in the counterclockwise direction, the control circuit controls the plurality of magnetic field generation parts on the assumption that a second position in the stator is in a position symmetrical, in a direction of a rotary shaft of the rotor, with a second position in the stator in a case where the rotor is rotated in the clockwise direction, a straight line that connects the first position and a center point of a rotation of the rotor being an axis of symmetry.

10. The control device according to claim 9, wherein
when a signal from the sensor is received and in a case where the rotor is rotated in the counterclockwise direction, the control circuit inverts and reads the signal, which is received from the sensor, in estimation of time until the first magnetic pole reaches the second position in the stator.

11. An image forming device comprising:
a three-phase a DC brushless motor including a rotating body on a surface of which an image is formed, a rotor that includes a plurality of magnetic poles and that is rotatable, a stator that includes a plurality of magnetic field generation parts to generate a magnetic field to be a driving source of the rotor, and a sensor configured to detect a magnetic pole of the rotor which magnetic pole passes through a first position in the stator, the three-phase a DC brushless motor being configured to drive the rotating body; and
a control circuit configured to control the three-phase DC brushless motor, wherein the control circuit
rotates the rotor at least a target number of rotations;
acquires a result of detection, which is performed by the sensor, of a first magnetic pole of the rotor passing through the first position,
estimates, based on a result of the detection of the first magnetic pole, time until the first magnetic pole reaches a second position in the stator, and
controls, based on a result of the estimation of the time until the second position is reached, the plurality of magnetic field generation parts in such a manner that a suitable magnetic field is generated when the first magnetic pole passes through the second position.

12. The image forming device according to claim 11, wherein the rotating body is a photoreceptor drum.

13. The image forming device according to claim 11, wherein the rotating body is an intermediate transfer belt.

14. The image forming device according to claim 11, wherein
the control circuit makes a first counter start counting with time, at which the sensor detects the first magnetic pole passing through the first position, as first reference time,
estimates first time from the first reference time to time until the first magnetic pole reaches the second position in the stator,
controls the plurality of magnetic field generation parts based on the first time in such a manner that a suitable magnetic field is generated when the first magnetic pole passes through the second position,
makes a second counter start counting with time, at which the sensor detects a second magnetic pole of the rotor which magnetic pole passes through the first position, as second reference time,
estimates second time from the second reference time to time until the second magnetic pole reaches the second position in the stator, and
controls the plurality of magnetic field generation parts based on the second time in such a manner that a suitable magnetic field is generated when the second magnetic pole passes through the second position.

15. The image forming device according to claim 11, wherein
the control circuit activates a free-run counter that presents elapse of time by counting up in a certain time interval, acquires a first value of the free-run counter in a case where the sensor detects the first magnetic pole passing through the first position, calculates, based on the first value, a second value of the free-run counter which value corresponds to time at which the first magnetic pole passes through the second position in the stator, and controls, when a value of the free-run counter becomes the second value, the plurality of magnetic field generation parts in such a manner that a suitable magnetic field is generated in a case where the first magnetic pole passes through the second position.

16. The image forming device according to claim 11, wherein the rotor is rotatable in both of a clockwise direction and a counterclockwise direction, and when the rotor is rotated in the counterclockwise direction, the control circuit controls the plurality of magnetic field generation parts on the assumption that a second position in the stator is in a position symmetrical, in a direction of a rotary shaft of the rotor, with a second position in the stator in a case where the rotor is rotated in the clockwise direction, a straight line that connects the first position and a center point of a rotation of the rotor being an axis of symmetry.

17. The image forming device according to claim 16, wherein when a signal from the sensor is received and in a case where the rotor is rotated in the counterclockwise direction, the control circuit inverts and reads the signal, which is received from the sensor, in estimation of time until the first magnetic pole reaches the second position in the stator.

* * * * *